United States Patent
Kawamata

(10) Patent No.: US 12,538,027 B2
(45) Date of Patent: Jan. 27, 2026

(54) IMAGE PROCESSING APPARATUS, IMAGE PROCESSING METHOD, AND SIMULATION SYSTEM

(71) Applicant: SONY SEMICONDUCTOR SOLUTIONS CORPORATION, Kanagawa (JP)

(72) Inventor: Daisuke Kawamata, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 236 days.

(21) Appl. No.: 18/259,426

(22) PCT Filed: Dec. 13, 2021

(86) PCT No.: PCT/JP2021/045808
§ 371 (c)(1),
(2) Date: Jun. 27, 2023

(87) PCT Pub. No.: WO2022/149411
PCT Pub. Date: Jul. 14, 2022

(65) Prior Publication Data
US 2024/0064405 A1    Feb. 22, 2024

(30) Foreign Application Priority Data
Jan. 7, 2021   (JP) .................. 2021-001454

(51) Int. Cl.
*H04N 23/68* (2023.01)
*G06T 5/50* (2006.01)
*G06V 10/60* (2022.01)

(52) U.S. Cl.
CPC ............. *H04N 23/689* (2023.01); *G06T 5/50* (2013.01); *G06V 10/60* (2022.01);
(Continued)

(58) Field of Classification Search
None
See application file for complete search history.

(56) References Cited

U.S. PATENT DOCUMENTS

| 10,939,042 B1 * | 3/2021 | Dolan | ................ | H04N 23/741 |
| 11,132,586 B2 * | 9/2021 | Tran | ...................... | G06N 3/04 |

(Continued)

FOREIGN PATENT DOCUMENTS

| JP | 2013-048713 A | 3/2013 |
| JP | 2013-066142 A | 4/2013 |

(Continued)

OTHER PUBLICATIONS

International Search Report and Written Opinion of PCT Application No. PCT/JP2021/045808, issued on Feb. 15, 2022, 09 pages of ISRWO.

*Primary Examiner* — James M Hannett
(74) *Attorney, Agent, or Firm* — CHIP LAW GROUP

(57) ABSTRACT

Provided is an image processing apparatus including a distortion addition processing unit that inputs object unit images that are images for a plurality of objects constituting one frame image, and performs addition processing of rolling shutter distortion for each of the object unit images on the basis of information on a rolling shutter time difference. The image processing apparatus further includes a composite image generation unit that generates a composite image obtained by combining the object unit images subjected to the addition processing by the distortion addition processing unit into one frame image.

13 Claims, 11 Drawing Sheets

(52) U.S. Cl.
CPC ..... *H04N 23/6811* (2023.01); *H04N 23/6845* (2023.01); *G06T 2207/20221* (2013.01)

(56) References Cited

U.S. PATENT DOCUMENTS

| | | | | |
|---|---|---|---|---|
| 2016/0044245 A1* | 2/2016 | Tsubaki | ............... | H04N 23/683 |
| | | | | 348/208.11 |
| 2019/0158716 A1* | 5/2019 | Kerr | ......................... | G06T 5/80 |

FOREIGN PATENT DOCUMENTS

| | | |
|---|---|---|
| JP | 2013-192227 A | 9/2013 |
| WO | 2018/156126 A1 | 8/2018 |
| WO | 2020/189081 A1 | 9/2020 |
| WO | 2021/177324 A1 | 9/2021 |

\* cited by examiner

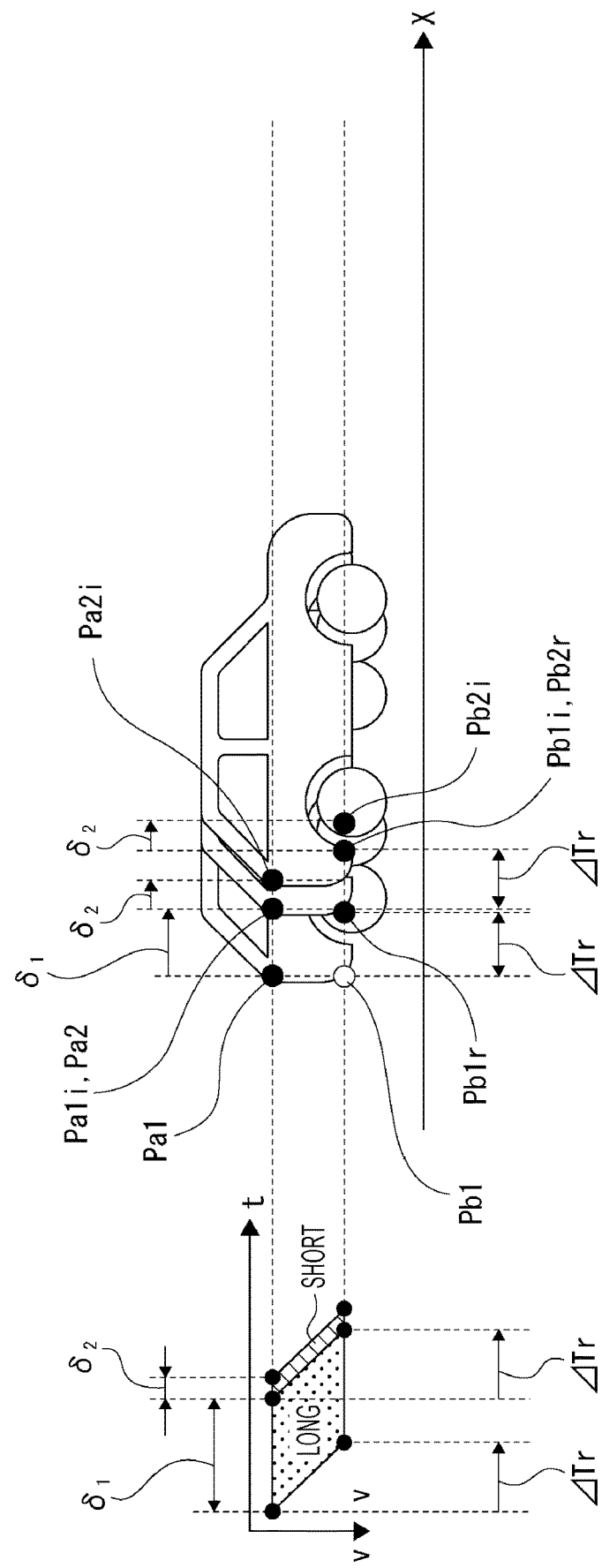

IMAGE PROCESSING APPARATUS, IMAGE PROCESSING METHOD, AND SIMULATION SYSTEM

CROSS REFERENCE TO RELATED APPLICATIONS

This application is a U.S. National Phase of International Patent Application No. PCT/JP2021/045808 filed on Dec. 13, 2021, which claims priority benefit of Japanese Patent Application No. JP 2021-001454 filed in the Japan Patent Office on Jan. 7, 2021. Each of the above-referenced applications is hereby incorporated herein by reference in its entirety.

TECHNICAL FIELD

The present technology relates to an image processing apparatus, a method thereof, and a simulation system, and particularly relates to a technology for reproducing an actual operation of an image sensor and generating a virtual captured image.

BACKGROUND ART

For example, as known as a hardware in the loop simulation (HILS) system or the like, in the development of an automated driving system of a vehicle such as an automobile, the control algorithm may be verified by simulation on a virtual space.

Automated driving control includes control on the basis of an image captured by an image sensor of an in-vehicle camera (a captured image of an environment outside the vehicle). In this case, a generated image (virtual captured image) by a virtual image sensor that generates a virtual captured image by simulating an operation of the image sensor is input to a simulation system such as a HILS system to an electronic control unit (ECU) that performs automated driving control.

In the HILS environment, various virtual devices that perform data input to the verification target ECU are required to have an operation speed equivalent to the operation speed in the actual use environment. That is, real-time operation is required. For example, the virtual image sensor is required to output an image at a frame rate (for example, 30 fps, 60 fps, or the like) in an actual use environment.

In addition, in an actual use environment, in a case where a rolling shutter type image sensor is used as the image sensor of the in-vehicle camera, rolling shutter distortion actually occurs in the captured image. In order to perform accurate simulation, a virtual image sensor is required to generate a virtual captured image in which such rolling shutter distortion is also reproduced.

Note that Patent Documents 1 to 3 below can be cited as related prior art. Patent Documents 1 to 3 disclose techniques for correcting an artifact (for example, motion blur or the like) generated in a captured image.

CITATION LIST

Patent Document

Patent Document 1: Japanese Patent Application Laid-Open No. 2013-192227
Patent Document 2: Japanese Patent Application Laid-Open No. 2013-48713
Patent Document 3: Japanese Patent Application Laid-Open No. 2013-66142

SUMMARY OF THE INVENTION

Problems to be Solved by the Invention

Here, in a case where rolling shutter distortion is added, a processing load increases as compared with a case where a frame image by one shot is output at a predetermined frame rate.

However, in an operation verification simulation system such as HILS, as described above, there is a request for real-time operation for a virtual device, and in a case where rolling shutter distortion is added, there is a possibility that the request cannot be satisfied due to an increase in processing load. In particular, in a case where a high frame rate is required for the virtual captured image, there is a high possibility that the request for the real-time operation cannot be satisfied.

The present technology has been made in view of the above circumstances, and an object thereof is to realize reproduction processing of a captured image obtained by an actual operation of an image sensor while satisfying a request for a real-time operation.

Solutions to Problems

An image processing apparatus according to the present technology includes: a distortion addition processing unit that inputs object unit images that are images for a plurality of objects constituting one frame image, and performs addition processing of rolling shutter distortion for each of the object unit images on the basis of information on a rolling shutter time difference; and a composite image generation unit that generates a composite image obtained by combining the object unit images subjected to the addition processing by the distortion addition processing unit into one frame image.

The information on the rolling shutter time difference is information indicating a charge accumulation start time difference between lines (between horizontal lines: between pixel rows) in a case where the rolling shutter method is adopted. By performing the addition processing of rolling shutter distortion for each object unit image as described above, the number of times of rendering required for the virtual captured image generation can be made the same as the number of objects, and the number of times of rendering can be significantly reduced as compared with the case of adding the rolling shutter distortion in units of lines.

In the above-described image processing apparatus according to the present technology, the distortion addition processing unit may perform processing of adding an offset value based on the information on the rolling shutter time difference to a coordinate value in a horizontal direction for each pixel of the objects as the addition processing of rolling shutter distortion.

By adding the offset value based on the information on the rolling shutter time difference to the coordinate value in the horizontal direction as described above, it is possible to add distortion according to the rolling shutter time difference to the object.

In the above-described image processing apparatus according to the present technology, the distortion addition processing unit may perform processing of adding an offset value based on the information on the rolling shutter time difference and a coordinate value in a vertical direction to a coordinate value in a horizontal direction for each pixel of the objects as the addition processing of rolling shutter distortion.

By adding the offset value based on the information on the rolling shutter time difference and the coordinate value in the vertical direction to the coordinate value in the horizontal direction as described above, it is possible to add appropriate rolling shutter distortion corresponding to the position of each pixel row in the image of the object.

In the above-described image processing apparatus according to the present technology, the rolling shutter time difference may be calculated on the basis of a total number of horizontal lines including horizontal lines scanned in a vertical blanking period and information on a time length of one frame period.

As a result, the addition processing of rolling shutter distortion is performed using the information of the rolling shutter time difference based on the actual operation of the image sensor.

The above-described image processing apparatus according to the present technology may include a blur addition processing unit that performs addition processing of motion blur to the object unit images on the basis of motion information of the objects and information of charge accumulation time.

As a result, it is possible to obtain a virtual captured image in which motion blur caused by the relationship between the motion of the object and the charge accumulation time is reproduced together with the addition of distortion caused by the rolling shutter method.

In the above-described image processing apparatus according to the present technology, the blur addition processing unit may calculate a moving distance within an accumulation time, which is a moving distance of the objects within the charge accumulation time, on the basis of the motion information and the information of the charge accumulation time, and perform the addition processing of motion blur on the basis of the moving distance within the accumulation time.

By using the information of the moving distance within the accumulation time as described above, the motion blur of the object occurring in the charge accumulation time can be appropriately reproduced.

In the above-described image processing apparatus according to the present technology, the blur addition processing unit may obtain an α-blend value for a background object on the basis of the motion information and the information of the charge accumulation time for the objects to be processed.

The image composition of each object can be appropriately performed in the composite image generation unit by obtaining the α-blend value for the background object for the object to be processed.

In the above-described image processing apparatus according to the present technology, the distortion addition processing unit may perform the addition processing of rolling shutter distortion on the object unit images before the addition processing of motion blur is performed by the blur addition processing unit.

If the addition of the motion blur is performed after the addition of the rolling shutter distortion, the motion blur is added to the object whose shape is distorted in the addition processing of motion blur, so that it is difficult to correctly reproduce the actual occurrence mode of the motion blur. On the other hand, if the addition processing of motion blur is performed before the rolling shutter distortion is added as described above, the motion blur can be added to the object of the real shape, so that the reproduction degree of the motion blur can be increased.

In the above-described image processing apparatus according to the present technology, the distortion addition processing unit may perform the addition processing of rolling shutter distortion on a first accumulation time image that is one of the object unit images in which a pixel value of each pixel is determined on the basis of information of a first charge accumulation time and a second accumulation time image that is one of the object unit images in which a pixel value of each pixel is determined on the basis of information of a second charge accumulation time shorter than the first charge accumulation time, and the composite image generation unit may generate a first composite image obtained by combining a plurality of the first accumulation time image subjected to the addition processing of rolling shutter distortion by the distortion addition processing unit into one frame image and a second composite image obtained by combining a plurality of the second accumulation time image subjected to the addition processing of rolling shutter distortion by the distortion addition processing unit into one frame image, the image processing apparatus further including a different accumulation time image combining unit that combines the first composite image and the second composite image.

As a result, it is possible to obtain a high dynamic range (HDR) image by combining at least two images of the first composite image and the second composite image.

In the above-described image processing apparatus according to the present technology, the distortion addition processing unit may perform the addition processing of rolling shutter distortion on three or more types of the object unit images in which a pixel value of each pixel is determined on the basis of information of three or more types of different charge accumulation times, the composite image generation unit may generate three or more types of different accumulation time images by combining a plurality of the object unit images into one frame image for each charge accumulation time with respect to the object unit images to which the addition processing of rolling shutter distortion has been applied by the distortion addition processing unit, and the different accumulation time image combining unit may combine the three or more types of different accumulation time images obtained by the composite image generation unit.

As a result, it is possible to appropriately reproduce the actual operation of the image sensor in the case of enhancing the effect of suppressing black crushing and white clipping by combining three or more types of images having different charge accumulation times.

In the above-described image processing apparatus according to the present technology, the distortion addition processing unit may perform the addition processing of rolling shutter distortion on two or more types of the object unit images in which a pixel value of each pixel is determined on the basis of information of two or more types of different light receiving sensitivities, and the composite image generation unit may generate two or more types of different-sensitivity images by combining a plurality of the object unit images into one frame image for each light receiving sensitivity with respect to the object unit images to which the addition processing of rolling shutter distortion has been applied by the distortion addition processing unit, the image processing apparatus further including a different-sensitivity image combining unit that combines the two or more types of different-sensitivity images obtained by the composite image generation unit.

As a result, it is possible to obtain an HDR image by combining at least two or more types of images having different light receiving sensitivities.

Therefore, the actual operation of the image sensor that outputs the HDR image can be appropriately reproduced.

In the above-described image processing apparatus according to the present technology, the composite image by the composite image generation unit may be output to a signal processing device included in a simulation system for verifying an operation algorithm of the signal processing device.

As a result, for example, in a simulation system that verifies an operation algorithm for performing various types of control based on an input image, such as an operation algorithm for realizing automated driving control, a virtual captured image that appropriately reproduces an actual operation of an image sensor can be supplied as an input image to a signal processing device as a verification target. Furthermore, it is possible to generate the virtual captured image so as to satisfy the request for the real-time operation of the signal processing device.

An image processing method according to the present technology is an image processing method including: inputting object unit images that are images for a plurality of objects constituting one frame image, and performing addition processing of rolling shutter distortion for each of the object unit images on the basis of information on a rolling shutter time difference; and generating a composite image obtained by combining the object unit images subjected to the addition processing into one frame image.

Also by such an image processing method, it is possible to obtain similar effects to those of the image processing apparatus according to the present technology described above.

A simulation system according to the present technology is a simulation system for verifying an operation algorithm of a signal processing device, the simulation system including: the signal processing device; and an image processing apparatus that outputs a virtual captured image to the signal processing device, the image processing apparatus including: a distortion addition processing unit that inputs object unit images that are images for a plurality of objects constituting one frame image, and performs addition processing of rolling shutter distortion for each of the object unit images on the basis of information on a rolling shutter time difference; and a composite image generation unit that generates a composite image obtained by combining the object unit images subjected to the addition processing by the distortion addition processing unit into one frame image, in which the composite image by the composite image generation unit is output to the signal processing device as the virtual captured image.

As a result, for example, in a simulation system that verifies an operation algorithm for performing various types of control based on an input image, such as an operation algorithm for realizing automated driving control, a virtual captured image that appropriately reproduces an actual operation of an image sensor can be supplied as an input image to a signal processing device as a verification target. Furthermore, it is possible to generate the virtual captured image so as to satisfy the request for the real-time operation of the signal processing device.

BRIEF DESCRIPTION OF DRAWINGS

FIG. 12 is an explanatory diagram of rolling shutter distortion and motion blur occurring in a long-accumulated image and a short-accumulated image.

MODE FOR CARRYING OUT THE INVENTION

Hereinafter, embodiments will be described in the following order.
<1. System Configuration>
<2. Hardware Configuration of Virtual Image Sensor>
<3. Functional Overview of Virtual Captured Image Generation>
<4. Rolling Shutter Distortion and Motion Blur>
<5. Virtual Captured Image Generation Method as Embodiment>
<6. Processing Procedure>
<7. Reproduction of HDR Image>
<8. Modifications>
<9. Summary of Embodiments>
<10. Present Technology>

<1. System Configuration>

Figure 1:
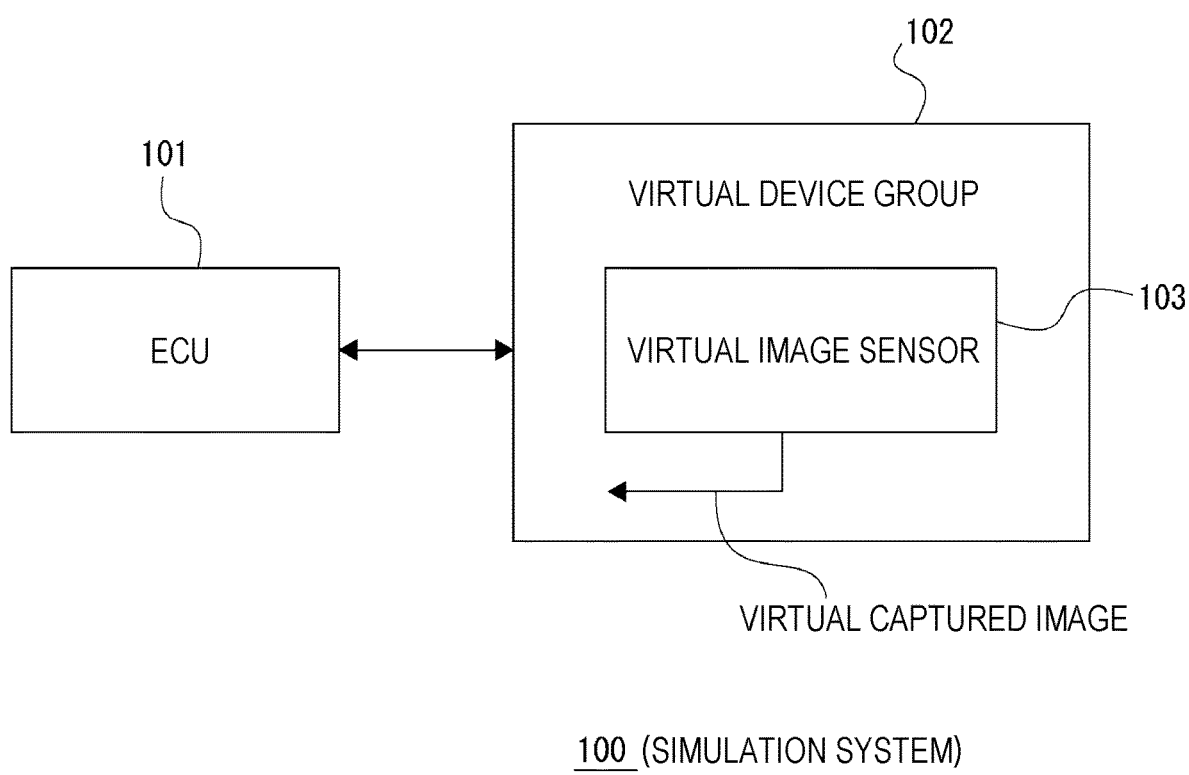
FIG. 1 is a block diagram illustrating a configuration example of a simulation system as an embodiment according to the present technology.

FIG. 1 illustrates a configuration example of a simulation system 100 as an embodiment according to the present technology.

The simulation system 100 is a system for detecting an operation algorithm of a target signal processing device. Specifically, the simulation system of the present example is configured as, for example, a hardware in the loop simulation (HILS) system for detecting an operation algorithm for automated driving control of a vehicle such as an automobile.

In this case, an ECU 101, which is an in-vehicle electronic control unit (ECU) that performs automated driving control, is used as the signal processing device to be verified. A virtual device group 102 in the drawing comprehensively represents a virtual device for inputting various types of data to the signal processing device as a verification target, and in the present example, comprehensively represents a virtual device for an in-vehicle device that outputs various types of detection data used for automated driving control.

As one of the virtual device group 102, a virtual image sensor 103 is provided in the simulation system 100 of the present example. The virtual image sensor 103 imitates an image sensor that obtains a captured image of the environment outside the vehicle used in the automated driving control, for example, an image sensor of an in-vehicle camera that captures at least one of the front, rear, or side of the control target vehicle.

As described later, the virtual image sensor 103 generates a virtual captured image on the basis of information of a plurality of objects constituting one frame image, and outputs the generated virtual captured image to the ECU 101.

Here, although not illustrated, in the actual HILS system, a high-speed serial interface (I/F) physically connected to the ECU 101 is provided, and the virtual captured image generated by the virtual image sensor 103 is transmitted to the ECU 101 via the I/F. At this time, in the high-speed I/F, protocol conversion is performed on the virtual captured image to be transmitted. Note that, in a case where the ECU 101 is a virtual device, the virtual captured image is transmitted via the memory.

<2. Hardware Configuration of Virtual Image Sensor>

Figure 2:
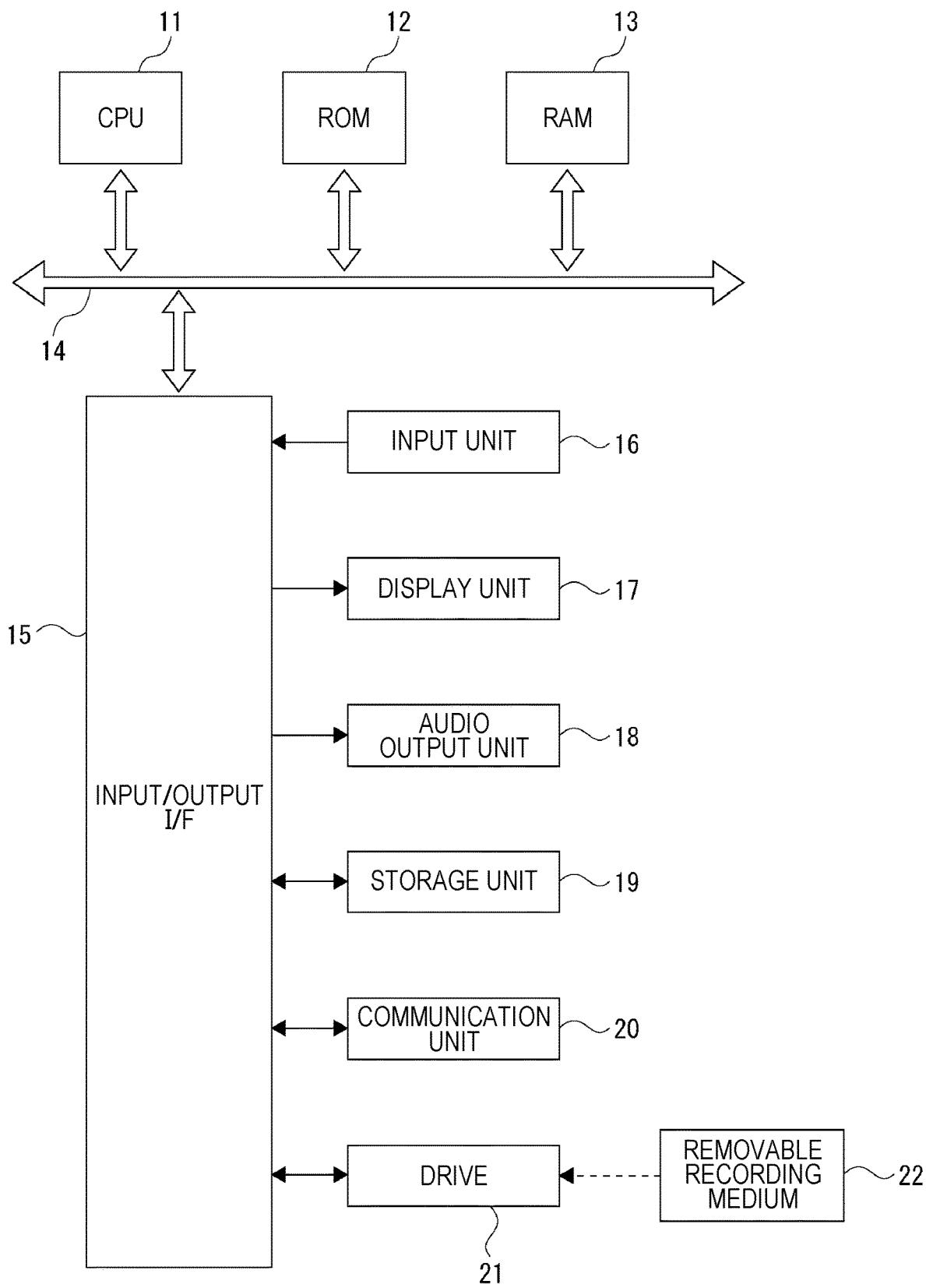
FIG. 2 is a block diagram illustrating a hardware configuration example of a virtual image sensor (image processing apparatus) as an embodiment.

FIG. 2 is a block diagram illustrating a hardware configuration example of an information processing apparatus 1 for realizing the virtual image sensor 103. In the present example, generation of the virtual captured image by the virtual image sensor 103 is realized by software processing of the information processing apparatus (computer device) 1.

In FIG. 2, a central processing unit (CPU) 11 of the information processing apparatus 1 executes various types of processing according to a program stored in a read only memory (ROM) 12 or a program loaded from a storage unit 19 to a random access memory (RAM) 13. As appropriate, the RAM 13 also stores data necessary for the CPU 11 to execute various kinds of processing.

The CPU 11, the ROM 12, and the RAM 13 are mutually connected via a bus 14. Furthermore, an input/output interface 15 is connected to the bus 14.

An input unit 16 including an operation element and an operation device is connected to the input/output interface 15.

For example, as the input unit 16, various types of operation elements and operation devices such as a keyboard, a mouse, a key, a dial, a touch panel, a touch pad, a remote controller, and the like are assumed.

Operation by a user is sensed by the input unit 16, and a signal corresponding to the input operation is interpreted by the CPU 11.

Furthermore, a display unit 17 including a liquid crystal display (LCD), an organic electro-luminescence (EL) panel, or the like, and an audio output unit 18 including a speaker or the like are integrally or separately connected to the input/output interface 15.

The display unit 17 is a display unit that performs various types of displays, and includes, for example, a display device provided in a housing of the information processing apparatus 1, a separate display device connected to the information processing apparatus 1, or the like.

On the basis of an instruction from the CPU 11, the display unit 17 executes display of an image for various kinds of image processing, a moving image to be processed, or the like, on a display screen. In addition, the display unit 17 displays various types of operation menus, icons, messages, and the like, that is, displays as a graphical user interface (GUI) on the basis of the instruction from the CPU 11.

The storage unit 19 including a hard disk, a solid-state memory, or the like, and a communication unit 20 including a modem or the like may be connected to the input/output interface 15.

The communication unit 20 performs communication with communication processing via a transmission line such as the Internet, wired/wireless communication with various devices, bus communication, or the like. In particular, in the present example, the communication unit 20 is used for data communication with the ECU 101 illustrated in FIG. 1.

Furthermore, a drive 21 is also connected to the input/output interface 15 as necessary, and a removable recording medium 22, such as a magnetic disk, an optical disk, a magneto-optical disk, or a semiconductor memory, is appropriately mounted.

The drive 21 can read a data file such as an image file, various computer programs, and the like from the removable recording medium 22. The read data file is stored in the storage unit 19, and an image or audio included in the data file is output by the display unit 17 or the audio output unit 18. Furthermore, a computer program or the like read from the removable recording medium 22 is installed in the storage unit 19 as necessary.

In the information processing apparatus 1, software can be installed via network communication by the communication unit 20 or the removable recording medium 22. Alternatively, the software may be stored in advance in the ROM 12, the storage unit 19, or the like.

Figure 3:
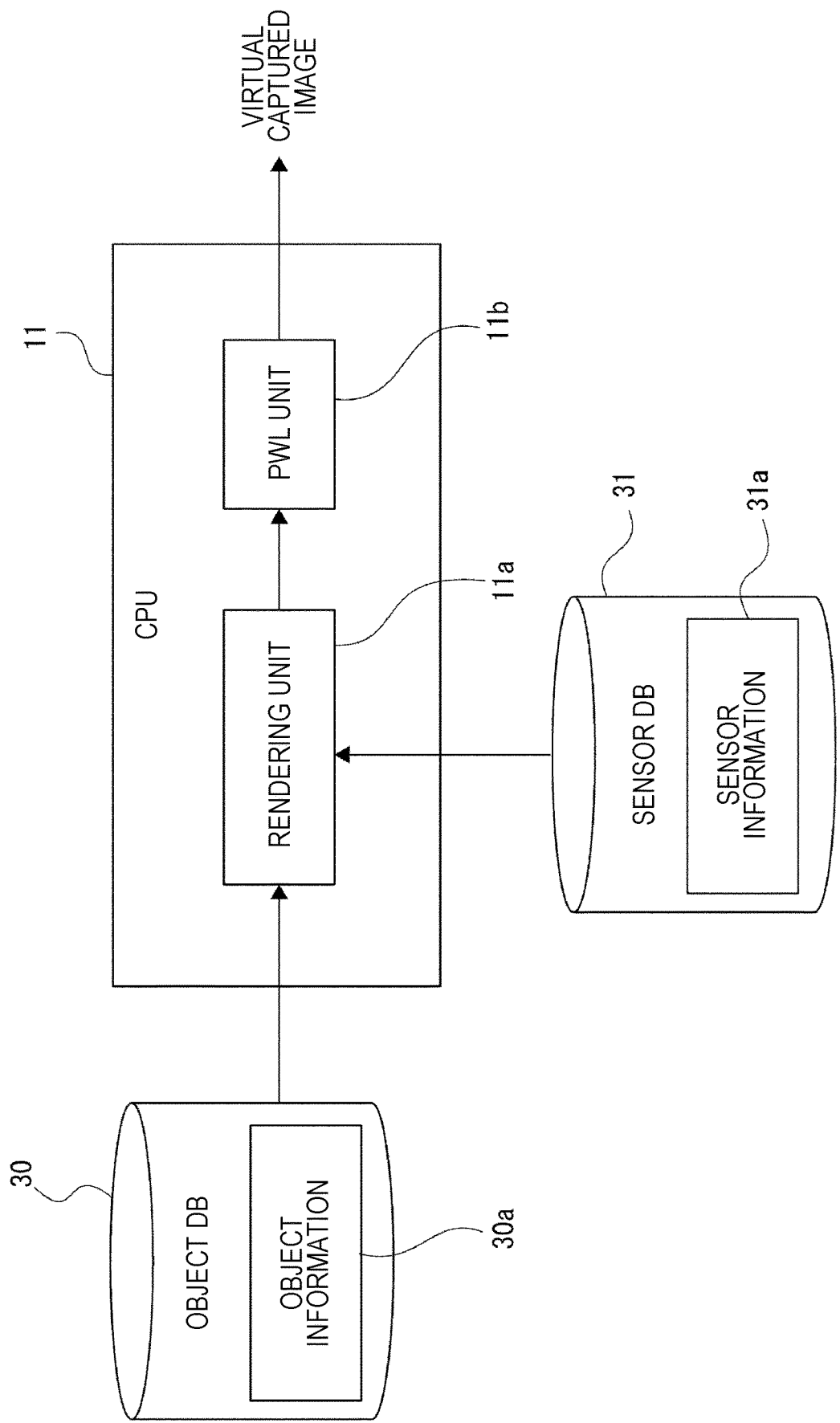
FIG. 3 is a diagram for explaining a functional overview of virtual captured image generation in an embodiment.
Figure 6:
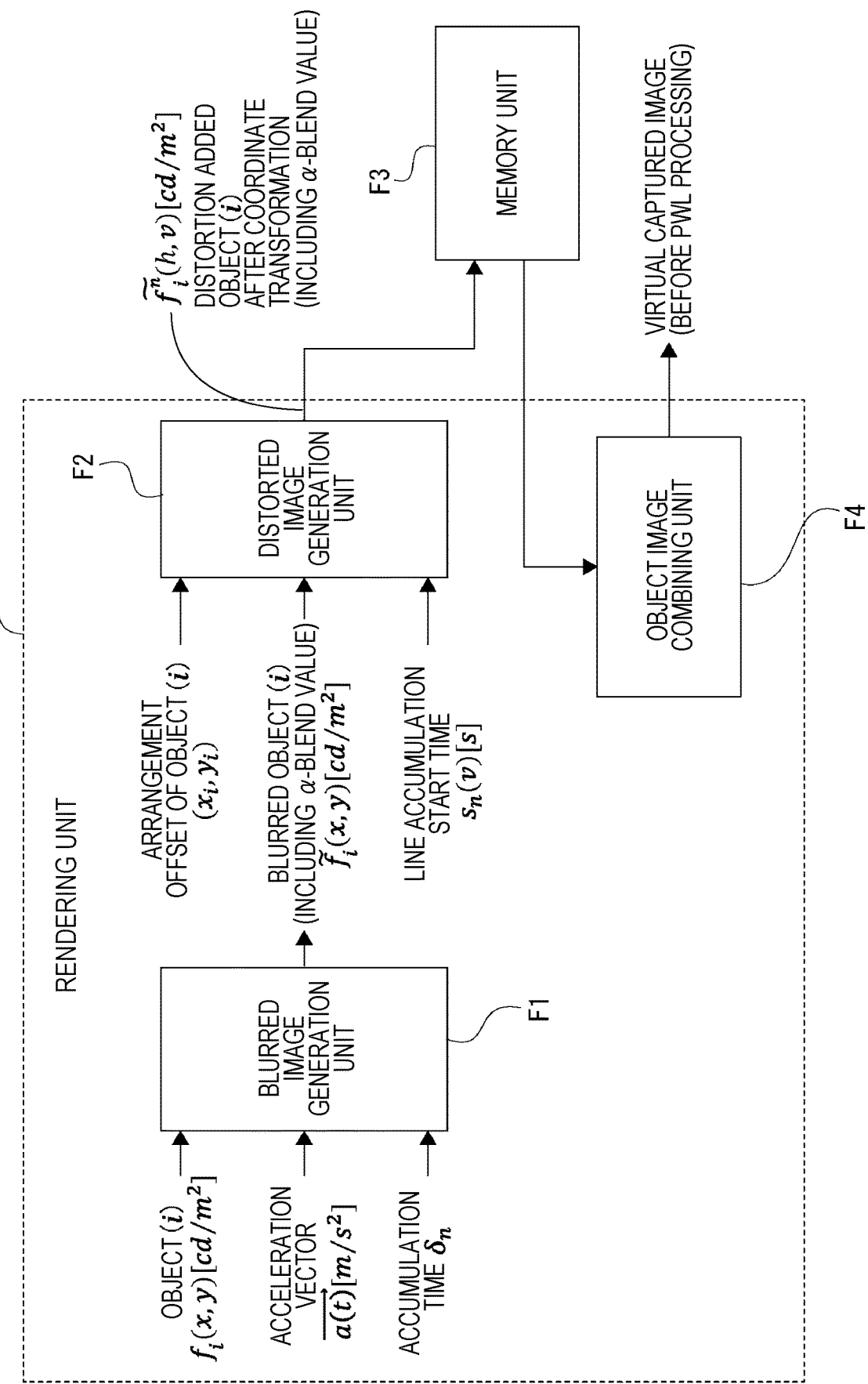
FIG. 6 is an explanatory diagram of functions related to virtual captured image generation included in a virtual image sensor as an embodiment.

In a case where the virtual image sensor 103 is realized using such an information processing apparatus 1, a processing function as illustrated in FIGS. 3 and 6 to be described later is realized in the CPU 11 by software, for example.

Here, regarding the image processing by the CPU 11, processing support by a hardware accelerator using a graphics processing unit (GPU) (not illustrated) or the like can also be performed.

<3. Functional Overview of Virtual Captured Image Generation>

A function overview of virtual captured image generation in the embodiment will be described with reference to FIG. 3.

First, in generating the virtual captured image, an object database (DB) 30 and a sensor DB 31 illustrated in the drawing are used.

The object DB 30 stores object information 30*a*.

The object information 30*a* is information regarding each object constituting one frame image to be generated as a virtual captured image.

The object mentioned here means an object that can be a subject in the virtual captured image. For example, in a case where a captured image used for automated driving control is assumed as in the present example, examples of the object include other vehicles such as a preceding vehicle, a person outside the vehicle as a pedestrian or the like, and a predetermined vehicle outside object such as an obstacle present on the own vehicle traveling path.

Furthermore, in the present example, as the object, a portion of a subject excluding the specific subjects by the specific vehicle, person, or the like exemplified above among the subjects constituting one frame image is treated as the background object. Therefore, in the present example, even if there is only one object as the specific subject, the object constituting one frame image includes a total of two objects including the object of the background.

In the following description, an identifier of an object constituting one frame image is referred to as an "object identifier i".

The object information 30a includes at least brightness information of an object necessary for reproducing the object as an image.

In the present example, as the brightness information of the object, the luminance value $f_i(x, y)$ [cd/m$^2$] of each pixel position of the object (i) is used. Here, (x, y) means coordinates of each pixel position in the coordinate system (x-y coordinate system) of the object.

As the brightness information of the object, information for each frame in the virtual captured image (moving image at a predetermined frame rate) is prepared in the present example. That is, in this case, for each frame of the virtual captured image, the object information 30a stores information of the luminance value $f_i(x, y)$ of each of the i objects included in the frame.

In the present example, as the brightness information of the object, information of brightness obtained in a case where the charge accumulation operation is performed at the same time as the charge accumulation time of the virtual image sensor 103 is used.

Note that the brightness information of the object (pixel value at each pixel position of the object) is not limited to the luminance value in units of [cd/m$^2$] (candela per square meter) described above, and brightness information in other units such as radiance [W/sr/m$^2$] (watt per steradian per square meter), for example, can also be used.

Furthermore, in the present example, the object information 30a includes motion information of an object necessary for reproducing the motion of a moving object such as a vehicle or a person.

Specifically, as the motion information of the object, information of the acceleration vector $a(t)\hat{}\rightarrow$[m/s$^2$] (note that, "$\hat{}\rightarrow$" means that "$\rightarrow$" is arranged on "a(t)") of the object (i) is used.

The motion information of the object is information used in addition processing of motion blur described later, and in the present example, information with a time granularity shorter than the charge accumulation time assumed by the virtual image sensor 103 is used. This is to cope with a case where the speed of movement of the object can change within the charge accumulation time.

"t" in the acceleration vector $a(t)\hat{}\rightarrow$ described above means each time at a time interval shorter than the charge accumulation time.

In the object information 30a of the present example, information of the acceleration vector $a(t)\hat{}\rightarrow$ at each time t described above is stored for each object as the motion information of the object.

Note that the addition processing of motion blur using the motion information of the object will be described later again.

The sensor DB 31 stores sensor information 31a.

The sensor information 31a is information regarding the operation of the virtual image sensor 103 and includes information indicating a charge accumulation time. In the present example, information on the charge accumulation time is prepared for each pixel row (for each horizontal line) of the virtual captured image. Hereinafter, the identifier of the horizontal line of the virtual captured image is referred to as "n", and the charge accumulation time for each horizontal line (n) is referred to as "accumulation time $\delta_n$".

Here, since the charge accumulation time can be different for each frame of the virtual captured image, the accumulation time $\delta_n$ is prepared for each frame of the virtual captured image and stored as the sensor information 31a. Note that, if the length of the accumulation time $\delta_n$ of each horizontal line is common in each frame, information on the charge accumulation time based on the common length can be stored for each frame.

The sensor information 31a as the accumulation time δn is used for addition processing of motion blur to be described later.

Furthermore, in the present example, since the charge accumulation operation by the rolling shutter method is assumed as the charge accumulation operation of the virtual image sensor 103, the sensor information 31a stores information indicating the rolling shutter time difference for each horizontal line. The information on the rolling shutter time difference is information indicating a charge accumulation start time difference between horizontal lines in a case where the rolling shutter method is adopted.

The information on the rolling shutter time difference is used for the addition processing of rolling shutter distortion to be described later, and details of the information on the rolling shutter time difference and the addition processing of rolling shutter distortion will be described later.

Here, the object DB 30 and the sensor DB 31 can be constructed in the storage unit 19 illustrated in FIG. 2, for example. Alternatively, it is also conceivable to construct the object DB 30 and the sensor DB 31 in a storage unit in an external device (for example, a server device or the like) communicable via the communication unit 20.

The CPU 11 includes a rendering unit 11a and a piecewise linear (PWL) unit 11b as functions for generating a virtual captured image.

The rendering unit 11a generates a virtual captured image on the basis of the object information 30a in the object DB 30. Specifically, the rendering unit 11a sequentially generates one frame image on the basis of the luminance value $f_i(x, y)$ of each object stored as the object information 30a for each frame, thereby generating a virtual captured image as a moving image.

Here, the rendering unit 11a in the embodiment performs addition processing of motion blur based on the information on the accumulation time $\delta_n$ in the object information 30a and the information on the acceleration vector $a(t)\hat{}\rightarrow$, and performs addition processing of rolling shutter distortion based on the information on the rolling shutter time difference stored as the sensor information 31a of the sensor DB 31. Specific examples of these processing will be described later.

The PWL unit 11b performs processing of compressing the bit depth of the pixel value for each pixel according to the brightness of the pixel for the virtual captured image generated by the rendering unit 11a. Specifically, processing of compressing the bit depth is performed for a pixel having a large pixel value.

In the present example, the virtual captured image after the compression processing by the PWL unit 11b is supplied to the ECU 101 illustrated in FIG. 1 as an output image of the virtual image sensor 103.

<4. Rolling Shutter Distortion and Motion Blur>

The rolling shutter distortion and the motion blur will be briefly described with reference to FIGS. 4 and 5.

Figure 4:
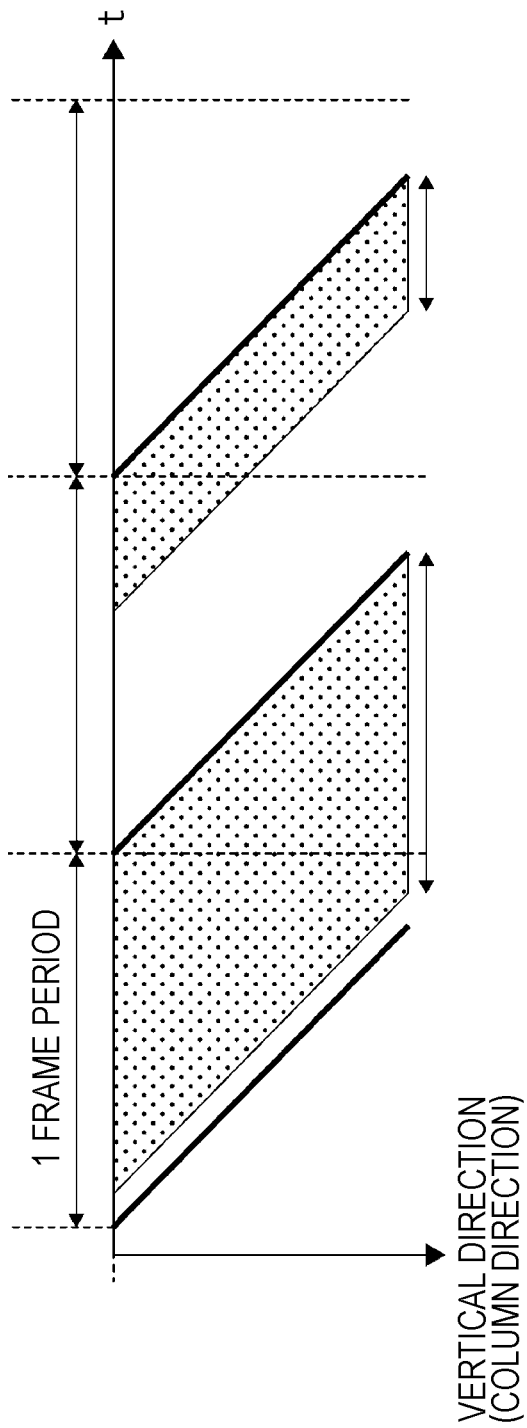
FIG. 4 is a diagram schematically illustrating a charge accumulation operation by a rolling shutter method.

FIG. 4 schematically illustrates the charge accumulation operation by the rolling shutter method, with the horizontal axis representing time and the vertical axis representing the vertical direction (column direction).

In the drawing, a satin portion indicated by a rhombus represents a charge accumulation time of each horizontal line, and an oblique line indicated by a thick black line represents a read timing of the accumulated charge. In the rolling shutter method, charge accumulation in each horizontal line is started in order of the horizontal lines. In addition, in each horizontal line, the accumulated charge is read according to the end of the charge accumulation time. That is, reading of the accumulated charges is also performed in order of horizontal lines.

A period from the start of the charge reading in the horizontal line sequence to the start of the next charge reading is set as one frame period as illustrated in the drawing.

The length of the charge accumulation time for each horizontal line may vary from frame to frame.

Figure 5:
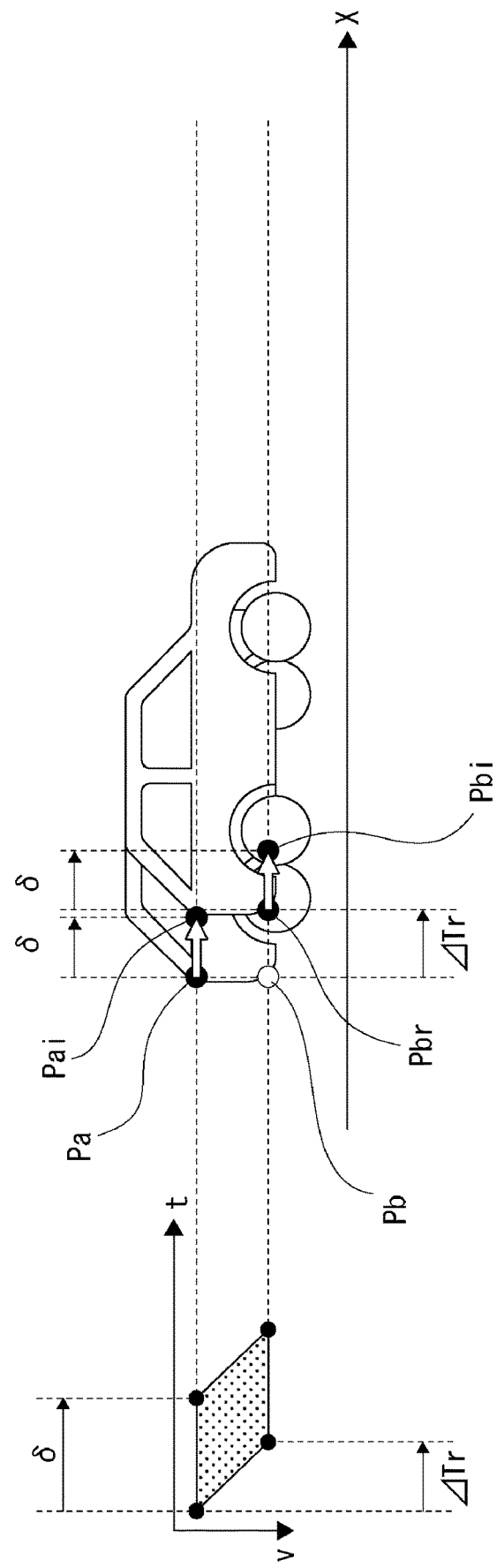
FIG. 5 is an explanatory diagram of rolling shutter distortion and motion blur.

FIG. 5 is an explanatory diagram of rolling shutter distortion and motion blur.

The rolling shutter distortion is distortion generated due to a difference in charge accumulation start timing between horizontal lines. In the right side of the drawing, an automobile is illustrated as an example of an object. As illustrated in the drawing, the uppermost position on the rearmost end surface of the automobile is referred to as a position Pa, and the lowermost position on the rearmost end surface is referred to as a position Pb.

On the left side in the drawing, the charge accumulation operation from the horizontal line including the position Pa to the horizontal line including the position Pb is schematically illustrated. As illustrated in the drawing, a time difference from the charge accumulation start timing of the horizontal line including the position Pa to the charge accumulation start timing of the horizontal line including the position Pb is referred to as "ΔTr".

The automobile as the object can move while the time elapses due to the time difference ΔTr, and the right side in the drawing illustrates the automobile after the time elapses by the time difference ΔTr and the position Pbr which is the position Pb after the time elapses by the time difference ΔTr.

As described above, in the rolling shutter method, the portion captured in the lower horizontal line where scanning is performed later in time is offset toward the moving direction side of the object, and such distortion appears as rolling shutter distortion.

Also, the object may move during the charge accumulation time δ. On the right side in the drawing, positions of the position Pa and the position Pbr after a lapse of time corresponding to the charge accumulation time δ in a case where the rolling shutter method is adopted are indicated as a position Pai and a position Pbi, respectively.

The position Pa moves to the position Pai during the charge accumulation time δ of the horizontal line including the position Pa, and the position Pbr moves to the position Pbi during the charge accumulation time δ of the horizontal line including the position Pbr (Pb). The movement of each point of the object during such a charge accumulation time δ causes blurring in the captured image, and the blurring appears as motion blur.

<5. Virtual Captured Image Generation Method as Embodiment>

As described above, in the actual operation of the image sensor, motion blur or rolling shutter distortion occurs in a captured image in a case where an object as a moving object is captured. In the virtual image sensor 103 (information processing apparatus 1) of the present embodiment, in order to obtain a virtual captured image according to the actual operation of the image sensor, the rendering unit 11a performs addition processing of motion blur and addition processing of rolling shutter distortion.

Here, regarding the addition processing of rolling shutter distortion, it is conceivable to render an image to which distortion is added in units of horizontal lines due to the nature of the rolling shutter distortion. However, if rendering is performed in units of horizontal lines, the number of times of rendering processing required to obtain a virtual captured image increases, and there is a possibility that real-time operation required for the virtual image sensor 103 in the simulation system 100 cannot be guaranteed.

Therefore, the present embodiment proposes a method of performing the addition processing of rolling shutter distortion for each image in units of objects (hereinafter referred to as "object unit image").

FIG. 6 is an explanatory diagram of functions of the rendering unit 11a.

As illustrated, the rendering unit 11a has functions as a blurred image generation unit F1, a distorted image generation unit F2, and an object image combining unit F4.

The blurred image generation unit F1 performs addition processing of motion blur on the target object (i) on the basis of the luminance value $f_i(x, y)$ of each pixel, the acceleration vector $a(t)\hat{\rightarrow}$ of the object (i), and the accumulation time $δ_n$ of the generation target frame.

Figure 7A:
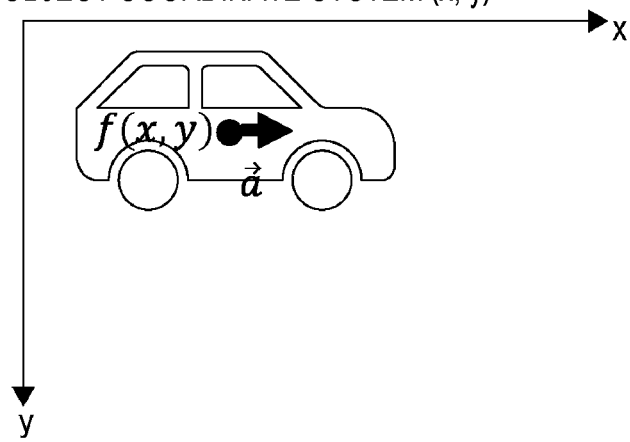
FIGS. 7A and 7B are explanatory diagrams of an object coordinate system and image range expansion of an object.

In the present example, the luminance value $f_i(x, y)$ of each pixel of the object unit image, that is, the object is managed as information of the x-y coordinate system as the object coordinate system. Also, the acceleration vector $a(t)\hat{\rightarrow}$ is set for each object (i). This image is illustrated in FIG. 7A.

Here, hereinafter, for the sake of explanation, the movement of the object (i) is assumed to be a uniform linear motion. In this case, information on the moving speed vl is used as the motion information of the object (i). The moving speed vl of the object (i) can be obtained from the acceleration vector $a(t)\hat{\rightarrow}$ (in this case, a constant value) for the object (i).

Note that, in a case where the uniform linear motion is assumed, information of the moving speed vl may be stored as the motion information of the object in the object information 30a.

Figure 7B:
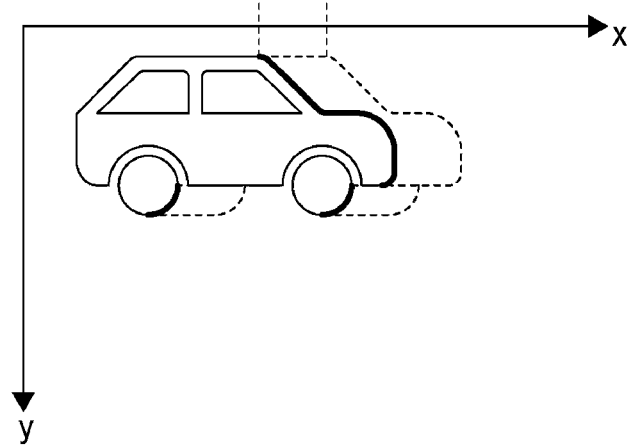

Furthermore, in a case where the addition processing of motion blur is performed, the range of the object unit image for the object (i) is expanded toward the moving direction side of the object (i) according to the moving amount (moving distance) of the object (i) within the charge accumulation time δ, as illustrated in FIG. 7B, in consideration of the range of the image blur caused by the charge accumulation time δ. Specifically, in the drawing, the original silhouette of the object unit image is indicated by a solid line, and among the pixels within the range of the original silhouette, pixels in which other pixels of the object do not exist on the moving direction side of the object are indicated by a thick solid line, but the range expansion of the object unit image here is performed by expanding each pixel indicated by the thick solid line to a pixel position separated on the object moving direction side by the moving amount "$δ_n×vl$". That is, the range of the object unit image after expansion is a range including both the range indicated by the solid line and the range indicated by the dotted line in the drawing.

Here, for the object (i), the luminance value of the pixel at the coordinates (x, y) after the addition processing of motion blur is set as "luminance value $f\tilde{\,}_i$" ("$\hat{\,}\tilde{\,}$" means that "$\tilde{\,}$" is arranged on "f").

The blurred image generation unit F1 obtains the luminance value $f\tilde{\,}_i$ of each pixel of the target object (i) by the following [Expression 1].

[Math 1]

$$\tilde{f}_i(x, y) = \frac{1}{\delta_n} \int_0^{\delta_n} f_i(x - vlt, y) df \qquad \text{[Expression 1]}$$

Note that, in [Expression 1], the polarity of the offset "vlt" given to the coordinate value of x is "−", but this is "+" when the moving direction of the object is the opposite direction (specifically, in the case of movement in a direction in which the x-coordinate value decreases), and the polarity of the offset "vlt" differs depending on the moving direction of the object.

Hereinafter, the luminance values $\mathrm{f}\char`\~_i$ of the coordinates (x, y) calculated for the object (i) by the above [Expression 1] will be collectively referred to as "luminance value $\mathrm{f}\char`\~_i(x, y)$ of blurred object (i)".

Furthermore, in the present example, the blurred image generation unit F1 obtains the α-blend value for the background object for the object (i) targeted for the addition processing of motion blur. The α-blend value is used in the α-blend processing performed when the object image combining unit F4 described later combines the image of each object after the addition processing of rolling shutter distortion into one frame image.

Assuming that the moving direction of the object is the forward direction and the opposite direction is the backward direction, in the object in which the motion blur occurs, the ratio of the presence of the object in the charge accumulation time δ is low in the front end portion and the rear end portion of the object, and the ratio of the presence of the object in the charge accumulation time δ is high in the central portion in the front-back direction of the object. Therefore, in the object unit image after the addition processing of motion blur (see FIG. 7B for the image range), the transmittance with respect to the background object differs between the front end portion, the rear end portion, and the central portion. Specifically, the transmittance is high at the front end portion and the rear end portion, and the transmittance is low at the central portion, and the α-blend value with respect to the background object is calculated in order to be able to reproduce the difference in transmittance.

For example, the blurred image generation unit F1 obtains a ratio at which the object is present within the accumulation time $\delta_n$ for each pixel of the object unit image (see FIG. 7B for the image range) on the basis of the motion information (here, the moving speed vl) of the object (i) and the information of the accumulation time $\delta_n$, and obtains the α-blend value for each pixel on the basis of the ratio.

The distorted image generation unit F2 generates an image obtained by adding rolling shutter distortion to the blurred object (i) on the basis of the luminance value $\mathrm{f}\char`\~_i(x, y)$ of the blurred object (i) obtained for the target object (i) by the blurred image generation unit F1, the arrangement offset $(x_i, y_i)$ of the object (i), and the line accumulation start time $S_n(v)$.

Here, the arrangement offset $(x_i, y_i)$ of the object (i) is information for performing coordinate transformation from the x-y coordinate system as the object coordinate system to the h-v coordinate system as the frame image coordinate system, and specifically, is information representing the coordinate offset amounts of x and y for the coordinate transformation for each pixel of the object (i). Note that, for confirmation, the frame image mentioned here is a frame image of a virtual captured image.

Figure 8:
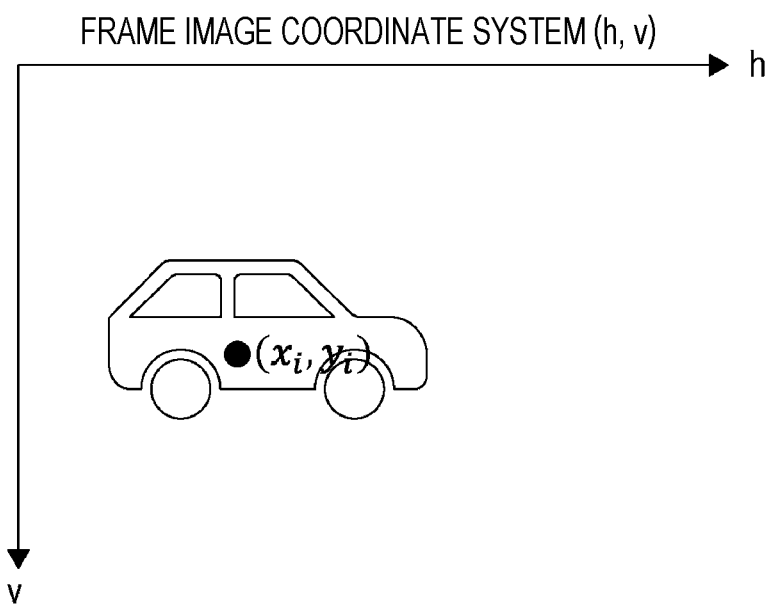
FIG. 8 is an image diagram of coordinate transformation from an object coordinate system to a frame image coordinate system.

FIG. 8 illustrates an image of coordinate transformation from the object coordinate system to the frame image coordinate system.

Note that the information of the arrangement offset $(x_i, y_i)$ for each object (i) may be stored in the object DB 30 as the object information 30a, for example.

The line accumulation start time $S_n(v)$ is a value for each v-coordinate in the frame image coordinate system. The unit is, for example, [s] (seconds).

The line accumulation start time $S_n(v)$ is calculated by the following [Expression 2], where the number of horizontal lines in one frame is VMAX, the frame rate of the virtual captured image is FrameRate (the unit is [1/s]: that is, "30" in the case of 30 fps), and the accumulation start offset is $o_n(v)$.

[Math 2]

$$s_n(v) = \frac{v}{VMAX * \text{FrameRate} + o_n(v)} \qquad \text{[Expression 2]}$$

The accumulation start offset $o_n(v)$ is an offset value related to the accumulation start timing for coping with a case where the rolling shutter time difference is different between the horizontal lines. Note that, if the rolling shutter time difference is the same between the horizontal lines, a fixed value (that is, a value that is unchanged with respect to the value of v) can be used as $o_n(v)$.

Furthermore, in the present example, as VMAX, a value of the total number of horizontal lines (that is, frame length lines (FLL)) including horizontal lines scanned in the vertical blanking period is used. As a result, information on the rolling shutter time difference based on the actual operation of the image sensor can be obtained.

Here, the accumulation start offset $o_n(v)$ is calculated by the distorted image generation unit F2 on the basis of VMAX, FrameRate, and the accumulation start offset $o_n(v)$. However, by storing information of the accumulation start offset $o_n(v)$ calculated in advance as the sensor information 31a, the distorted image generation unit F2 may omit calculation by [Expression 2] at the time of the addition processing of rolling shutter distortion.

In the present example, the distorted image generation unit F2 applies coordinate transformation to the frame image coordinate system together with the addition of the rolling shutter distortion to the luminance values $\mathrm{f}\char`\~_i(x, y)$ of the blurred object (i) to calculate the "luminance value $\mathrm{f}\char`\~_i(h, v)$ of the distortion added object (i) after the coordinate transformation" representing the object unit image after the rolling shutter distortion addition in the frame image coordinate system ("^~" means that "~" is arranged on "f"). Specifically, the luminance value $f''\char`\~_i(h, v)$ of the distortion added object (i) after the coordinate transformation is obtained by the following [Expression 3].

[Math 3]

$$\tilde{f}_i^n(h,v) = \tilde{f}_i(h - x_i + s_n(v), v - y_i) \qquad \text{[Expression 3]}$$

Figure 9:
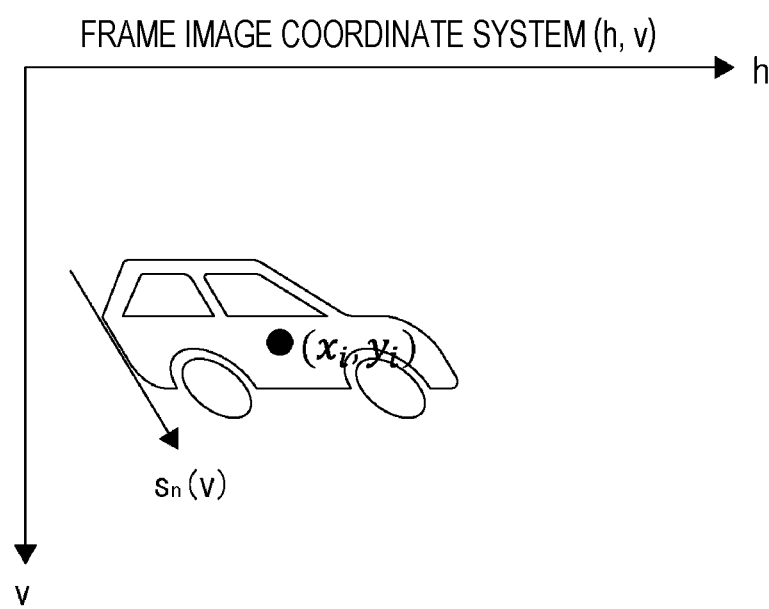
FIG. 9 is a diagram illustrating an image of addition processing of rolling shutter distortion in an embodiment.

FIG. 9 illustrates an image of addition processing of rolling shutter distortion according to [Expression 3].

The operation according to [Expression 3] corresponds to changing the coordinate value of h by an offset amount corresponding to the line accumulation start time $S_n(v)$ obtained by the coordinate value of v for the luminance values $\mathrm{f}\char`\~_i(x, y)$ of the blurred object (i) coordinate-transformed into the frame image coordinate system.

As a result, rolling shutter distortion can be reproduced.

The blurred image generation unit F1 and the distorted image generation unit F2 execute the addition processing of motion blur and the addition processing of rolling shutter distortion described above for each object (i) constituting one frame image as the virtual captured image. The image of each object (i) obtained by performing the addition processing of motion blur and the addition processing of rolling shutter distortion is temporarily held in the memory unit F3. Here, the memory unit F3 may be any storage device that can be written and read by the CPU 11, such as the RAM 13 and the storage unit 19 illustrated in FIG. 2, for example.

In addition, the α-blend value calculated for each object (i) by the blurred image generation unit F1 is temporarily held in the memory unit F3 via the distorted image generation unit F2. That is, the value is held in the memory unit F3 as a value for each pixel position after the coordinate transformation into the frame image coordinate system.

The object image combining unit F4 combines the image after the addition processing of the motion blur and the rolling shutter distortion of each object (i) held in the memory unit F3 as described above into one frame image on the basis of the α-blend value for each object (i) similarly held in the memory unit F3.

As a result, an image for one frame of the virtual captured image is obtained.

In the rendering unit 11a, the above-described processes of the blurred image generation unit F1, the distorted image generation unit F2, and the object image combining unit F4 are repeated for each frame of the virtual captured image. As a result, a virtual captured image (before PWL processing) as a moving image is obtained.

<6. Processing Procedure>

Figure 10:
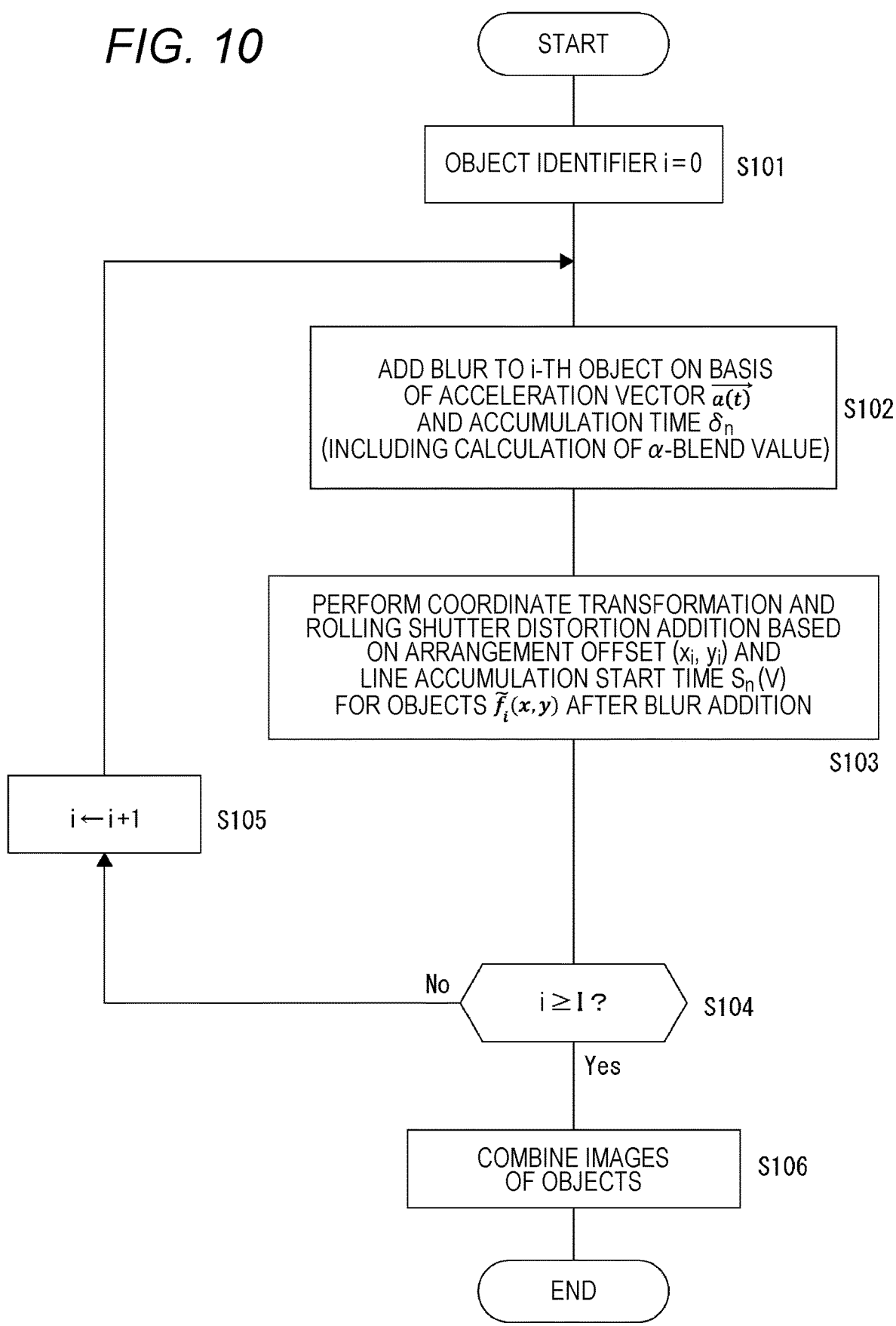
FIG. 10 is a flowchart illustrating a specific processing procedure example for realizing a virtual captured image generation method as an embodiment.

FIG. 10 is a flowchart illustrating a specific processing procedure example for realizing the virtual captured image generation method as the embodiment described above.

In the present example, the series of processing illustrated in FIG. 10 is executed by the CPU 11 on the basis of a program stored in a storage device such as the ROM 12. The CPU 11 repeatedly executes a series of processing illustrated in FIG. 10 for each frame of the virtual captured image.

First, in step S101, the CPU 11 resets the object identifier i to 0, and in subsequent step S102, blur is added to the i-th object on the basis of the acceleration vector $a(t)\hat{}\rightarrow$ and the accumulation time $\delta_n$. That is, on the basis of the acceleration vector $a(t)\hat{}\rightarrow$ for the i-th object stored in the object DB 30 as the object information 30a and the accumulation time δ n stored in the sensor DB 31 as the sensor information 31a, addition processing of motion blur is performed according to [Expression 1] described above.

In addition, in step S102, the CPU 11 obtains the ratio of the presence of the object within the accumulation time δn for each pixel on the basis of the moving speed vl calculated from the acceleration vector $a(t)\hat{}\rightarrow$ and the information of the accumulation time δn for the i-th object, and obtains the α-blend value for each pixel on the basis of the ratio.

In step S103 subsequent to step S102, the CPU 11 performs coordinate transformation and rolling shutter distortion addition based on the arrangement offset $(x_i, y_i)$ and the line accumulation start time $S_n(v)$ for the objects $f'\sim_i(x, y)$ after blur addition. That is, for the luminance value $f'\sim_i(x, y)$ of the blurred object (i) obtained in [Expression 1], the luminance value $f''\sim_i(h, v)$ of the distortion added object (i) after the coordinate transformation is calculated by performing the operation illustrated in [Expression 3] on the basis of the arrangement offset $(x_i, y_i)$ and the line accumulation start time $S_n(v)$.

Note that, as understood from the above description, in association with the coordinate transformation based on the arrangement offset $(x_i, y_i)$, the coordinate value associated with the α-blend value obtained in step S102 is converted from the coordinate value of the object coordinate system to the coordinate value of the frame image coordinate system.

In step S104 subsequent to step S103, the CPU 11 determines whether or not the object identifier i is greater than or equal to the maximum value I. Here, the maximum value I is the total number of objects constituting the frame to be processed. Therefore, in other words, the determination processing in step S104 is processing of determining whether or not the processing in steps S102 and S103 has been executed for all the objects constituting the frame to be processed.

When the object identifier i is not equal to or larger than the maximum value I, the CPU 11 proceeds to step S105, increments the object identifier i by 1, and returns to step S102.

On the other hand, when the object identifier i is greater than or equal to the maximum value I, the CPU 11 proceeds to step S106 and performs processing of combining the images of the objects. That is, as described as the processing of the object image combining unit F4, the processing of combining the image of each object obtained as the luminance value $f''\sim_i(h, v)$ of the distortion added object (i) after the coordinate transformation into one frame image on the basis of the α-blend value (value after the coordinate transformation) obtained for each object is performed.

In response to execution of the combining processing in step S106, the CPU 11 ends the series of processing illustrated in FIG. 10.

<7. Reproduction of HDR Image>

The virtual captured image generation method as the embodiment is applicable to generation of a high dynamic range (HDR) image. As is well known, the HDR image is an image generated by combining a plurality of images having different brightness, for example, by combining a captured image obtained by a charge accumulation operation with a first charge accumulation time and a captured image obtained by a charge accumulation operation with a second charge accumulation time shorter than the first charge accumulation time, and the like.

Hereinafter, the signs of the first and second charge accumulation times are "$\delta_1$" and "$\delta_2$", respectively.

In addition, the captured image obtained in the charge accumulation operation with the first charge accumulation time Si will be referred to as a "long-accumulated image", and the captured image obtained in the charge accumulation operation with the second charge accumulation time $\delta_2$ will be referred to as a "short-accumulated image".

Figure 11:
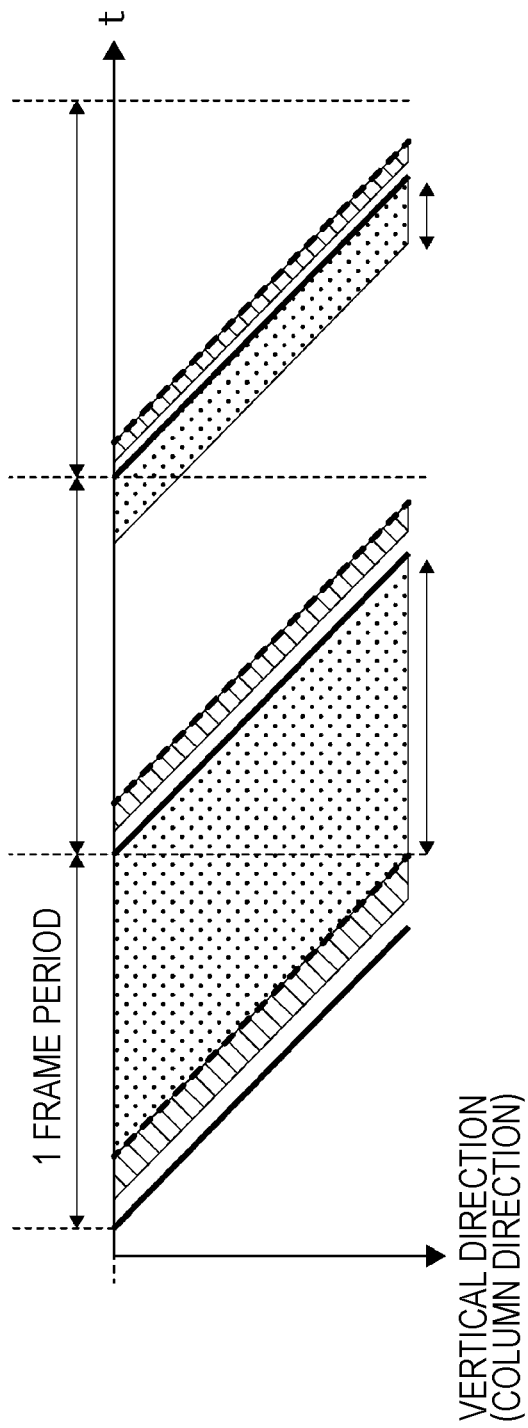
FIG. 11 is an explanatory diagram of a charge accumulation operation in a case of generating an HDR image.

As illustrated in FIG. 11, as the charge accumulation operation in the case of generating an HDR image, a first charge accumulation time $\delta_1$ (in the drawing, represented by a satin pattern) for long-accumulated image generation and a second charge accumulation time $\delta_2$ (in the drawing, represented by a diagonal line pattern) for short-accumulated image generation are secured within one frame period. The oblique lines by the thick solid lines in the drawing indicate the read timing of the charge accumulated in the first charge accumulation time $\delta_1$ (that is, the read timing of the long-accumulated image), and the oblique lines by the thick dotted lines indicate the read timing of the charge accumulated in the second charge accumulation time $\delta_2$ (the read timing of the short-accumulated image).

FIG. 12 is an explanatory diagram of rolling shutter distortion and motion blur occurring in a long-accumulated image and a short-accumulated image.

FIG. 12 illustrates an automobile as an example of an object similarly to FIG. 5 described above. Similarly to FIG. 5, assuming that the uppermost position in the rearmost end surface of the automobile is a position Pa and the lowermost position of the rearmost end surface is a position Pb, the left side in the drawing schematically illustrates the charge accumulation operation of each of the long-accumulated image and the short-accumulated image for the charge accumulation operation from the horizontal line including the position Pa to the horizontal line including the position Pb.

On the right side in the drawing, a position Pa1 represents a position where the position Pa is present at the charge accumulation start timing of the horizontal line including the position Pa during the charge accumulation operation of the long-accumulated image, and a position Pb1 represents a position where the position Pb is present at the charge accumulation start timing of the horizontal line including the position Pa. The position Pb1r represents a position at which the position Pb is present at the charge accumulation start timing of the horizontal line including the position Pb during the charge accumulation operation of the long-accumulated image, in other words, a position at which the position Pb1 is present after the lapse of time corresponding to the time difference ΔTr (see the description of FIG. 5).

Furthermore, on the right side in the drawing, a position Pa1i represents a position after the first charge accumulation time $\delta_1$ has elapsed with respect to the position Pa1, and a position Pb1i represents a position after the first charge accumulation time $\delta_1$ has elapsed with respect to the position Pb1r.

Further, a position Pa2 represents a position where the position Pa is present at the charge accumulation start timing of the horizontal line including the position Pa during the charge accumulation operation of the short-accumulated image. As illustrated in the charge accumulation operation on the left side in the drawing, here, as an operation for each horizontal line, charge accumulation for the same line of the short-accumulated image is started immediately after line reading of the long-accumulated image, and thus the position Pa2 is substantially the same position as the above-described position Pa1i.

In addition, the position Pb2r represents a position where the position Pb is present at the charge accumulation start timing of the horizontal line including the position Pb during the charge accumulation operation of the short-accumulated image. This position Pb2r can be rephrased as a position where the position Pb is present after a time corresponding to the time difference ΔTr has elapsed from the charge accumulation start timing of the horizontal line including the position Pa during the charge accumulation operation of the short-accumulated image.

Similarly to the relationship between the position Pa1i and the position Pa2 described above, the position Pb2r is substantially the same as the position Pb1i.

The position Pa2i represents a position after the second charge accumulation time $\delta_2$ has elapsed with respect to the position Pa2, and the position Pb2i represents a position after the second charge accumulation time $\delta_2$ has elapsed with respect to the position Pb2r.

As can be seen with reference to FIG. 12, the rolling shutter distortion occurs similarly regardless of whether it is a long-accumulated image or a short-accumulated image. That is, the distortion occurs as distortion corresponding to the moving amount of the object within the period of the time difference ΔTr. Therefore, the rolling shutter distortion can be appropriately reproduced by executing the above-described processing of the distorted image generation unit F2 for each of the long-accumulated image and the short-accumulated image.

Furthermore, the motion blur can be reproduced on the basis of the first charge accumulation time $\delta_1$ because the long-accumulated image is generated by movement of the object within the first charge accumulation time $\delta_1$, and can be reproduced on the basis of the second charge accumulation time $\delta_2$ because the short-accumulated image is generated by movement of the object within the second charge accumulation time $\delta_2$.

In a case of supporting HDR image generation, brightness information of a long-accumulated image and brightness information of a short-accumulated image are stored in the object information 30a for each object (i). The brightness (pixel value) of each pixel of the object (i) for the long-accumulated image is determined on the basis of the first charge accumulation time $\delta_1$, and the brightness (pixel value) of each pixel of the object (i) for the short-accumulated image is determined on the basis of the second charge accumulation time $\delta_2$.

The blurred image generation unit F1 in this case performs the addition processing of motion blur for each object (i) (see [Expression 1] above) for each of the long-accumulated image and the short-accumulated image on the basis of the brightness information for each pixel of each object (i) stored for each of the long-accumulated image and the short-accumulated image as the object information 30a as described above. Note that, also in this case, the blurred image generation unit F1 calculates the α-blend value for the background object by a method similar to the one described above.

Furthermore, the distorted image generation unit F2 in this case performs addition processing of rolling shutter distortion on the luminance values f'$\sim_i$ (x, y) of the blurred object (i) obtained for each of the long-accumulated image and the short-accumulated image by the blurred image generation unit F1 (see [Expression 2] and [Expression 3] above).

In this case, the blurred image generation unit F1 and the distorted image generation unit F2 perform the addition processing of motion blur (including the calculation of the α-blend value) and the addition processing of rolling shutter distortion (including the coordinate transformation to the frame image coordinate system) for each object (i) on the long-accumulated image side and the short-accumulated image side, respectively.

In this case, an image (the luminance values f''$\sim_i$(h, v) of the distortion added object (i) after the coordinate transformation described above) for each object (i) obtained by the processing of the blurred image generation unit F1 and the distorted image generation unit F2 for each of the long-accumulated image side and the short-accumulated image side as described above is input to the object image combining unit F4. The object image combining unit F4 in this case combines the image for each object (i) on the long-accumulated image side into one frame image to generate a virtual long-accumulated image that is a virtual captured image for the long-accumulated image, and combines the image for each object (i) on the short-accumulated image side into one frame image to generate a virtual short-accumulated image that is a virtual captured image for the short-accumulated image.

The virtual image sensor 103 (rendering unit 11a) in this case has a function as a different accumulation time image combining unit that performs HDR composition of the virtual long-accumulated image and the virtual short-accumulated image generated as described above. Note that, in the HDR composition, for example, a known HDR composition method is only required to be adopted, for example, image composition by α-blending or the like is performed by increasing a blend ratio of pixel values in a region in which a pixel value (for example, a luminance value) is equal to or greater than a predetermined value in the virtual long-accumulated image (for example, a region in which white clipping have occurred) in the virtual short-accumulated image, and by increasing a blend ratio of pixel values in a region in which a pixel value is equal to or less than a predetermined value in the virtual short-accumulated image (for example, a region in which black crushing have occurred) in the virtual long-accumulated image.

Note that, in the above description, an example has been described in which two types of images having different charge accumulation times are combined as the HDR composition, but the HDR composition can also be performed as composition of three or more types of images having different charge accumulation times. In this case, the distorted image generation unit F2 performs the addition processing of rolling shutter distortion for three or more types of object unit images in which the pixel value of each pixel is determined on the basis of information of three or more types of different charge accumulation times, and the object image combining unit F4 combines a plurality of object unit images into one frame image for each charge accumulation time for the object unit image subjected to the addition processing of rolling shutter distortion by the distorted image generation unit F2 to generate three or more types of different accumulation time images. Then, the different accumulation time image combining unit described above combines three or more types of different accumulation time images obtained by the object image combining unit F4 in this manner.

Further, the HDR composition is not limited to the composition of images having different charge accumulation times. For example, even if the charge accumulation time is the same, it is also possible to combine a plurality of types of images obtained from pixels having different light receiving sensitivities. In this case, the distorted image generation unit F2 performs the addition processing of rolling shutter distortion on two or more types of object unit images in which the pixel value of each pixel is determined on the basis of information of two or more types of different light receiving sensitivities, and the object image combining unit F4 combines the plurality of object unit images into one frame image for each light receiving sensitivity for the object unit image on which the addition processing of rolling shutter distortion has been performed by the distorted image generation unit F2 to generate two or more types of different-sensitivity images. Furthermore, a different-sensitivity image combining unit that combines two or more types of different-sensitivity images obtained by the object image combining unit F4 in this manner is provided.

<8. Modifications>

Here, the embodiments are not limited to the specific examples described above, and may be configured as various modifications.

For example, in the above description, an example has been described in which the addition processing of motion blur is performed together with the addition processing of rolling shutter distortion, but it is not essential to perform the addition processing of motion blur.

Furthermore, in the above description, an example has been described in which the present technology is applied to a control device development environment by a hardware in the loop simulation (HILS) system. However, the present technology can also be suitably applied to a development environment using another simulation system such as a model in the loop simulation (MILS) system or a software in the loop simulation (SILS) system, for example.

Furthermore, the present technology can be widely and suitably applied not only to the field of vehicle control but also to a technical field related to development of a control device that controls a target on the basis of a virtual captured image.

<9. Summary of Embodiments>

As described above, the image processing apparatus (information processing apparatus 1: virtual image sensor 103) according to the embodiment includes: a distortion addition processing unit (distorted image generation unit F2) that inputs object unit images that are images for a plurality of objects constituting one frame image, and performs addition processing of rolling shutter distortion for each of the object unit images on the basis of information on a rolling shutter time difference; and a composite image generation unit (object image combining unit F4) that generates a composite image obtained by combining the object unit images subjected to the addition processing by the distortion addition processing unit into one frame image.

By performing the addition processing of rolling shutter distortion for each object unit image as described above, the number of times of rendering required for the virtual captured image generation can be made the same as the number of objects, and the number of times of rendering can be significantly reduced as compared with the case of adding the rolling shutter distortion in units of lines.

Therefore, the reproduction processing of the captured image obtained by the actual operation of the image sensor can be realized while satisfying the request for the real-time operation.

Furthermore, in the image processing apparatus according to the embodiment, the distortion addition processing unit performs processing of adding an offset value (line accumulation start time $S_n(v)$) based on the information on the rolling shutter time difference to a coordinate value in a horizontal direction for each pixel of the objects as the addition processing of rolling shutter distortion.

By adding the offset value based on the information on the rolling shutter time difference to the coordinate value in the horizontal direction as described above, it is possible to add distortion according to the rolling shutter time difference to the object.

Therefore, appropriate addition processing of rolling shutter distortion can be realized.

Furthermore, in the image processing apparatus according to the embodiment, the distortion addition processing unit performs processing of adding an offset value (line accumulation start time $S_n(v)$) based on the information on the rolling shutter time difference and a coordinate value in a vertical direction to a coordinate value in a horizontal direction for each pixel of the objects as the addition processing of rolling shutter distortion.

By adding the offset value based on the information on the rolling shutter time difference and the coordinate value in the vertical direction to the coordinate value in the horizontal direction as described above, it is possible to add appropriate rolling shutter distortion corresponding to the position of each pixel row in the image of the object.

Therefore, the accuracy of the addition processing of rolling shutter distortion can be improved.

Furthermore, in the image processing apparatus according to the embodiment, the rolling shutter time difference is calculated on the basis of a total number of horizontal lines including horizontal lines (VMAX) scanned in a vertical blanking period and information on a time length of one frame period (reciprocal of FrameRate).

As a result, the addition processing of rolling shutter distortion is performed using the information of the rolling shutter time difference based on the actual operation of the image sensor.

Therefore, the accuracy of the addition processing of rolling shutter distortion can be improved.

Furthermore, the image processing apparatus according to the embodiment includes a blur addition processing unit (blurred image generation unit F1) that performs addition processing of motion blur to the object unit images on the basis of motion information of the objects and information of charge accumulation time.

As a result, it is possible to obtain a virtual captured image in which motion blur caused by the relationship between the motion of the object and the charge accumulation time is reproduced together with the addition of distortion caused by the rolling shutter method.

Therefore, it is possible to generate a virtual captured image more appropriate to the actual operation of the image sensor.

Furthermore, in the image processing apparatus according to the embodiment, the blur addition processing unit calculates a moving distance ($\delta_n \times vl$) within an accumulation time, which is a moving distance of the objects within the charge accumulation time, on the basis of the motion information and the information of the charge accumulation time, and performs the addition processing of motion blur on the basis of the moving distance within the accumulation time.

By using the information of the moving distance within the accumulation time as described above, the motion blur of the object occurring in the charge accumulation time can be appropriately reproduced.

Furthermore, in the image processing apparatus of the embodiment, the blur addition processing unit obtains an $\alpha$-blend value for a background object on the basis of the motion information and the information of the charge accumulation time for the objects to be processed.

The image composition of each object can be appropriately performed in the composite image generation unit by obtaining the $\alpha$-blend value for the background object for the object to be processed.

Therefore, it is possible to generate a virtual captured image according to the actual operation of the image sensor.

Furthermore, in the image processing apparatus according to the embodiment, the distortion addition processing unit performs the addition processing of rolling shutter distortion on the object unit images before the addition processing of motion blur is performed by the blur addition processing unit (see FIGS. 6 and 10).

If the addition of the motion blur is performed after the addition of the rolling shutter distortion, the motion blur is added to the object whose shape is distorted in the addition processing of motion blur, so that it is difficult to correctly reproduce the actual occurrence mode of the motion blur. On the other hand, if the addition processing of motion blur is performed before the rolling shutter distortion is added as described above, the motion blur can be added to the object of the real shape, so that the reproduction degree of the motion blur can be increased.

Therefore, it is possible to generate a virtual captured image more appropriate to the actual operation of the image sensor.

Furthermore, in the image processing apparatus according to the embodiment, the distortion addition processing unit performs the addition processing of rolling shutter distortion on a first accumulation time image that is one of the object unit images in which a pixel value of each pixel is determined on the basis of information of a first charge accumulation time and a second accumulation time image that is one of the object unit images in which a pixel value of each pixel is determined on the basis of information of a second charge accumulation time shorter than the first charge accumulation time, and the composite image generation unit generates a first composite image (virtual long-accumulated image) obtained by combining a plurality of the first accumulation time image subjected to the addition processing of rolling shutter distortion by the distortion addition processing unit into one frame image and a second composite image (virtual short-accumulated image) obtained by combining a plurality of the second accumulation time image subjected to the addition processing of rolling shutter distortion by the distortion addition processing unit into one frame image, the image processing apparatus further including a different accumulation time image combining unit that combines the first composite image and the second composite image.

As a result, it is possible to obtain an HDR image by combining at least two images of the first composite image and the second composite image.

Therefore, the actual operation of the image sensor that outputs the HDR image can be appropriately reproduced.

Furthermore, in the image processing apparatus according to the embodiment, the distortion addition processing unit performs the addition processing of rolling shutter distortion on three or more types of the object unit images in which a pixel value of each pixel is determined on the basis of information of three or more types of different charge accumulation times, the composite image generation unit generates three or more types of different accumulation time images by combining a plurality of the object unit images into one frame image for each charge accumulation time with respect to the object unit images to which the addition processing of rolling shutter distortion has been applied by the distortion addition processing unit, and the different accumulation time image combining unit combines the three or more types of different accumulation time images obtained by the composite image generation unit.

As a result, it is possible to appropriately reproduce the actual operation of the image sensor in the case of enhancing the effect of suppressing black crushing and white clipping by combining three or more types of images having different charge accumulation times.

Furthermore, in the image processing apparatus according to the embodiment, the distortion addition processing unit performs the addition processing of rolling shutter distortion on two or more types of the object unit images in which a pixel value of each pixel is determined on the basis of information of two or more types of different light receiving sensitivities, and the composite image generation unit generates two or more types of different-sensitivity images by combining a plurality of the object unit images into one frame image for each light receiving sensitivity with respect to the object unit images to which the addition processing of rolling shutter distortion has been applied by the distortion addition processing unit, the image processing apparatus further including a different-sensitivity image combining unit that combines the two or more types of different-sensitivity images obtained by the composite image generation unit.

As a result, it is possible to obtain an HDR image by combining at least two or more types of images having different light receiving sensitivities.

Therefore, the actual operation of the image sensor that outputs the HDR image can be appropriately reproduced.

Furthermore, in the image processing apparatus of the embodiment, the composite image by the composite image generation unit is output to a signal processing device included in a simulation system (100) for verifying an operation algorithm of the signal processing device (ECU 101).

As a result, for example, in a simulation system that verifies an operation algorithm for performing various types of control based on an input image, such as an operation algorithm for realizing automated driving control, a virtual captured image that appropriately reproduces an actual operation of an image sensor can be supplied as an input image to a signal processing device as a verification target. Furthermore, it is possible to generate the virtual captured image so as to satisfy the request for the real-time operation of the signal processing device.

Therefore, in the simulation system for verifying the operation algorithm of the signal processing device, the simulation accuracy can be improved.

An image processing method according to the embodiment is an image processing method including: inputting object unit images that are images for a plurality of objects constituting one frame image, and performing addition processing of rolling shutter distortion for each of the object unit images on the basis of information on a rolling shutter time difference; and generating a composite image obtained by combining the object unit images subjected to the addition processing into one frame image.

According to such an image processing method, it is possible to obtain functions and effects similar to those of the image processing apparatus as the above-described embodiment.

Furthermore, a simulation system (100) of the embodiment is a simulation system for verifying an operation algorithm of a signal processing device, the simulation system including: the signal processing device (ECU 101); and an image processing apparatus (information processing apparatus 1: virtual image sensor 103) that outputs a virtual captured image to the signal processing device.

Then, the image processing apparatus includes: a distortion addition processing unit that inputs object unit images that are images for a plurality of objects constituting one frame image, and performs addition processing of rolling shutter distortion for each of the object unit images on the basis of information on a rolling shutter time difference; and a composite image generation unit that generates a composite image obtained by combining the object unit images subjected to the addition processing by the distortion addition processing unit into one frame image, in which the composite image by the composite image generation unit is output to the signal processing device as the virtual captured image.

As a result, for example, in a simulation system that verifies an operation algorithm for performing various types of control based on an input image, such as an operation algorithm for realizing automated driving control, a virtual captured image that appropriately reproduces an actual operation of an image sensor can be supplied as an input image to a signal processing device as a verification target. Furthermore, it is possible to generate the virtual captured image so as to satisfy the request for the real-time operation of the signal processing device.

Therefore, in the simulation system for verifying the operation algorithm of the signal processing device, the simulation accuracy can be improved.

Here, as an embodiment, it is possible to consider a program for causing, for example, a CPU, a digital signal processor (DSP), or the like, or a device including the CPU, the DSP, or the like, to execute the processing by the rendering unit 11a described with reference to FIG. 6 and the like.

That is, the program of the embodiment is a program that can be read by a computer device, the program causing the computer device to realize functions of: inputting object unit images that are images for a plurality of objects constituting one frame image, and performing addition processing of rolling shutter distortion for each of the object unit images on the basis of information on a rolling shutter time difference; and generating a composite image obtained by combining the object unit images subjected to the addition processing into one frame image.

With such a program, the above-described rendering unit 11a can be realized in a device as the information processing apparatus 1.

Such a program can be recorded in advance in an HDD as a storage medium built in a device such as a computer device, a ROM in a microcomputer having a CPU, or the like.

Alternatively, in addition, the program can be temporarily or permanently stored (recorded) in a removable recording medium such as a flexible disk, a compact disc read only memory (CD-ROM), a magneto optical (MO) disk, a digital versatile disc (DVD), a Blu-ray Disc (registered trademark), a magnetic disk, a semiconductor memory, or a memory card. Such a removable recording medium can be provided as so-called package software.

Furthermore, such a program can be installed from the removable recording medium into a personal computer or the like, or can be downloaded from a download site via a network such as a local area network (LAN) or the Internet.

Furthermore, such a program is suitable for a wide range of provision of the rendering unit 11a of the embodiment. For example, by downloading the program to a personal computer, a portable information processing apparatus, a mobile phone, a game device, a video device, a personal digital assistant (PDA), or the like, the personal computer or the like can be caused to function as an apparatus that realizes processing as the rendering unit 11a of the present disclosure.

Note that the effects described in the present specification are merely examples and are not limited, and other effects may be provided.

<10. Present Technology>

Note that the present technology can also employ the following configurations.

(1)

An image processing apparatus including:
  a distortion addition processing unit that inputs object unit images that are images for a plurality of objects constituting one frame image, and performs addition processing of rolling shutter distortion for each of the object unit images on the basis of information on a rolling shutter time difference; and
  a composite image generation unit that generates a composite image obtained by combining the object unit images subjected to the addition processing by the distortion addition processing unit into one frame image.

(2)

The image processing apparatus according to (1), in which the distortion addition processing unit performs processing of adding an offset value based on the information on the rolling shutter time difference to a coordinate value in a horizontal direction for each pixel of the objects as the addition processing of rolling shutter distortion.

(3)

The image processing apparatus according to (2), in which the distortion addition processing unit performs processing of adding an offset value based on the information on the rolling shutter time difference and a coordinate value in a vertical direction to a coordinate value in a horizontal direction for each pixel of the objects as the addition processing of rolling shutter distortion.

(4)

The image processing apparatus according to (2) or (3), in which the rolling shutter time difference is calculated on the basis of a total number of horizontal lines including horizontal lines scanned in a vertical blanking period and information on a time length of one frame period.

(5)

The image processing apparatus according to any one of (1) to (4), further including a blur addition processing unit that performs addition processing of motion blur to the object unit images on the basis of motion information of the objects and information of charge accumulation time.

(6)

The image processing apparatus according to (5), in which the blur addition processing unit calculates a moving distance within an accumulation time, which is a moving distance of the objects within the charge accumulation time, on the basis of the motion information and the information of the charge accumulation time, and performs the addition processing of motion blur on the basis of the moving distance within the accumulation time.

(7)

The image processing apparatus according to (5) or (6), in which the blur addition processing unit obtains an α-blend value for a background object on the basis of the motion information and the information of the charge accumulation time for the objects to be processed.

(8)

The image processing apparatus according to any one of (5) to (7), in which the distortion addition processing unit performs the addition processing of rolling shutter distortion on the object unit images before the addition processing of motion blur is performed by the blur addition processing unit.

(9)

The image processing apparatus according to any one of (1) to (8), in which the distortion addition processing unit performs the addition processing of rolling shutter distortion on a first accumulation time image that is one of the object unit images in which a pixel value of each pixel is determined on the basis of information of a first charge accumulation time and a second accumulation time image that is one of the object unit images in which a pixel value of each pixel is determined on the basis of information of a second charge accumulation time shorter than the first charge accumulation time, and the composite image generation unit generates a first composite image obtained by combining a plurality of the first accumulation time image subjected to the addition processing of rolling shutter distortion by the distortion addition processing unit into one frame image and a second composite image obtained by combining a plurality of the second accumulation time image subjected to the addition processing of rolling shutter distortion by the distortion addition processing unit into one frame image, the image processing apparatus further including a different accumulation time image combining unit that combines the first composite image and the second composite image.

(10)

The image processing apparatus according to (9), in which the distortion addition processing unit performs the addition processing of rolling shutter distortion on three or more types of the object unit images in which a pixel value of each pixel is determined on the basis of information of three or more types of different charge accumulation times, the composite image generation unit generates three or more types of different accumulation time images by combining a plurality of the object unit images into one frame image for each charge accumulation time with respect to the object unit images to which the addition processing of rolling shutter distortion has been applied by the distortion addition processing unit, and the different accumulation time image combining unit combines the three or more types of different accumulation time images obtained by the composite image generation unit.

(11)

The image processing apparatus according to any one of (1) to (8), in which the distortion addition processing unit performs the addition processing of rolling shutter distortion on two or more types of the object unit images in which a pixel value of each pixel is determined on the basis of information of two or more types of different light receiving sensitivities, and the composite image generation unit generates two or more types of different-sensitivity images by combining a plurality of the object unit images into one frame image for each light receiving sensitivity with respect to the object unit images to which the addition processing of rolling shutter distortion has been applied by the distortion addition processing unit, the image processing apparatus further including a different-sensitivity image combining unit that combines the two or more types of different-sensitivity images obtained by the composite image generation unit.

(12)

The image processing apparatus according to any one of (1) to (11), in which the composite image by the composite image generation unit is output to a signal processing device included in a simulation system for verifying an operation algorithm of the signal processing device.

(13)
An image processing method including:
  inputting object unit images that are images for a plurality of objects constituting one frame image, and performing addition processing of rolling shutter distortion for each of the object unit images on the basis of information on a rolling shutter time difference; and
  generating a composite image obtained by combining the object unit images subjected to the addition processing into one frame image.

(14)
A simulation system for verifying an operation algorithm of a signal processing device, the simulation system including:
  the signal processing device; and
  an image processing apparatus that outputs a virtual captured image to the signal processing device,
  the image processing apparatus including:
    a distortion addition processing unit that inputs object unit images that are images for a plurality of objects constituting one frame image, and performs addition processing of rolling shutter distortion for each of the object unit images on the basis of information on a rolling shutter time difference; and
    a composite image generation unit that generates a composite image obtained by combining the object unit images subjected to the addition processing by the distortion addition processing unit into one frame image,
  in which the composite image by the composite image generation unit is output to the signal processing device as the virtual captured image.

REFERENCE SIGNS LIST

100 Simulation system
1 Information processing apparatus
11 CPU
12 ROM
13 RAM
14 Bus
15 Input/output interface
16 Input unit
17 Display unit
18 Audio output unit
19 Storage unit
20 Communication unit
21 Drive
22 Removable recording medium
11a Rendering unit
11b PWL unit
30 Object DB (database)
30a Object information
31 Sensor DB (database)
31a Sensor information
F1 Blurred image generation unit
F2 Distorted image generation unit
F3 Memory unit
F4 Object image combining unit

The invention claimed is:

1. An image processing apparatus, comprising:
  a distortion addition processing unit configured to:
    input object unit images, wherein the object unit images are images for a plurality of objects that constitute a first frame image; and
    perform a first addition process of rolling shutter distortion, for each object unit image of the object unit images, based on information on a rolling shutter time difference, wherein the first addition process includes:
      a first process, for each pixel of the plurality of objects, of an addition of an offset value, that is based on the information on the rolling shutter time difference, to a first coordinate value in a horizontal direction; and
  a composite image generation unit configured to generate a specific composite image based on a combination of the object unit images subjected to the first addition process into a second frame image.

2. The image processing apparatus according to claim 1, wherein the first addition process further includes:
  a second process, for each pixel of the plurality of objects, of addition of the offset value and a second coordinate value in a vertical direction to the first coordinate value in the horizontal direction.

3. The image processing apparatus according to claim 1, wherein the rolling shutter time difference is calculated based on
  a total number of horizontal lines including horizontal lines scanned in a vertical blanking period, and
  information on a time length of one frame period.

4. The image processing apparatus according to claim 1, further comprising
  a blur addition processing unit configured to perform a second addition process of motion blur to the object unit images, based on of motion information of the plurality of objects and information of charge accumulation time.

5. The image processing apparatus according to claim 4, wherein the blur addition processing unit is further configured to:
  calculate, based on the motion information and the information of the charge accumulation time, a moving distance of the plurality of objects within the charge accumulation time; and
  perform the second addition process of motion blur based on the moving distance within the charge accumulation time.

6. The image processing apparatus according to claim 4, wherein the blur addition processing unit is further configured to obtain, based on the motion information and the information of the charge accumulation time for the plurality of objects to be processed, an α-blend value for a background object of the plurality of objects.

7. The image processing apparatus according to claim 4, wherein the first addition process of the rolling shutter distortion on the object unit images is before the second addition process of motion blur.

8. The image processing apparatus according to claim 1, wherein
  the distortion addition processing unit is further configured to perform the first addition process of the rolling shutter distortion on a first accumulation time image and a second accumulation time image, wherein
    the first accumulation time image is a first object unit image of the object unit images in which determination of a first pixel value of the each pixel is based on information of a first charge accumulation time,
    the second accumulation time image is a second object unit image of the object unit images in which a determination of a second pixel value of the each pixel is based on information of a second charge accumulation time, and the second charge accumulation time is shorter than the first charge accumulation time, the composite image generation unit is further configured to generate:
- a first composite image based on a combination of a plurality of first accumulation time images subjected to the first addition process of the rolling shutter distortion into a third frame image,
    wherein the plurality of first accumulation time images includes the first accumulation time image; and
- a second composite image based on a combination of a plurality of second accumulation time images subjected to the first addition process of the rolling shutter distortion into a fourth frame image,
    wherein the plurality of second accumulation time images includes the second accumulation time image, and the image processing apparatus further comprising a different accumulation time image combining unit configured to combine the first composite image and the second composite image.

9. The image processing apparatus according to claim 8, wherein
the distortion addition processing unit is further configured to perform the first addition process of the rolling shutter distortion on at least three types of the object unit images in which a determination of a third pixel value of the each pixel is based on information of at least three types of different charge accumulation times,
the composite image generation unit is further configured to generate at least three types of different accumulation time images based on a combination of a plurality of the object unit images into a fifth frame image for each charge accumulation time with respect to the object unit images to which the first addition process of the rolling shutter distortion has been applied, and
the different accumulation time image combining unit is further configured to combine the at least three types of different accumulation time images.

10. The image processing apparatus according to claim 1, wherein
the distortion addition processing unit is further configured to perform the first addition process of the rolling shutter distortion on at least two types of the object unit images in which a determination of a first pixel value of the each pixel is based on information of at least two types of different light receiving sensitivities,
the composite image generation unit is further configured to generate at least two types of different-sensitivity images based on a combination of a plurality of the object unit images into a third frame image for each light receiving sensitivity with respect to the object unit images to which the first addition process of the rolling shutter distortion has been applied, and the image processing apparatus further comprising a different-sensitivity image combining unit configured to combine the at least two types of different-sensitivity images.

11. The image processing apparatus according to claim 1, wherein the specific composite image is output to a signal processing device included in a simulation system to verify an operation algorithm of the signal processing device.

12. An image processing method, comprising:
inputting object unit images that are images for a plurality of objects constituting a first frame image;
performing addition processing of rolling shutter distortion for each object unit image of the object unit images, based on information on a rolling shutter time difference, wherein the addition processing includes:
    processing, for each pixel of the plurality of objects, of adding an offset value, that is based on the information on the rolling shutter time difference, to a coordinate value in a horizontal direction; and
generating a composite image by combining the object unit images subjected to the addition processing into a second frame image.

13. A simulation system, comprising:
a signal processing device, wherein the simulation system is configured to verify an operation algorithm of the signal processing device; and
an image processing apparatus configured to output a virtual captured image to the signal processing device, wherein the image processing apparatus includes:
    a distortion addition processing unit configured to:
        input object unit images, wherein the object unit images are images for a plurality of objects that constitutes a first frame image; and
        perform an addition process of rolling shutter distortion, for each object unit image of the object unit images, based on information on a rolling shutter time difference, wherein the addition process includes:
            a process, for each pixel of the plurality of objects, of an addition of an offset value, that is based on the information on the rolling shutter time difference, to a coordinate value in a horizontal direction; and
    a composite image generation unit configured to generate a composite image based on a combination of the object unit images subjected to the addition process into a second frame image, and
    the composite image is output to the signal processing device as the virtual captured image.

* * * * *